United States Patent
van Diggelen et al.

(10) Patent No.: US 8,692,712 B2
(45) Date of Patent: Apr. 8, 2014

(54) METHOD AND APPARATUS FOR PROCESSING OF SATELLITE SIGNALS WITHOUT TIME OF DAY INFORMATION

(75) Inventors: Frank van Diggelen, San Jose, CA (US); Charles Abraham, San Jose, CA (US)

(73) Assignee: Global Locate, Inc., Irvine, CA (US)

( * ) Notice: Subject to any disclaimer, the term of this patent is extended or adjusted under 35 U.S.C. 154(b) by 1138 days.

(21) Appl. No.: 11/775,212

(22) Filed: Jul. 9, 2007

(65) Prior Publication Data

US 2008/0036651 A1    Feb. 14, 2008

Related U.S. Application Data

(60) Continuation of application No. 11/077,309, filed on Mar. 10, 2005, now Pat. No. 7,245,253, which is a division of application No. 10/461,890, filed on Jun. 13, 2003, now Pat. No. 6,937,187, which is a continuation-in-part of application No. 10/190,745, filed on Jul. 8, 2002, now Pat. No. 6,734,821, which is a continuation-in-part of application No. 09/715,860, filed on Nov. 17, 2000, now Pat. No. 6,417,801.

(51) Int. Cl.
    *G01S 19/27*    (2010.01)

(52) U.S. Cl.
    CPC ........................... *G01S 19/27* (2013.01)
    USPC ......................................... 342/357.66

(58) Field of Classification Search
    CPC .......................................... G01S 19/27
    USPC ............... 342/357.15, 357.66; 701/226
    See application file for complete search history.

(56) References Cited

U.S. PATENT DOCUMENTS

| | | | |
|---|---|---|---|
| 4,445,118 A | 4/1984 | Taylor et al. |
| 4,894,662 A | 1/1990 | Counselman |
| 5,119,504 A | 6/1992 | Durboraw, III |
| 5,225,842 A | 7/1993 | Brown et al. |

(Continued)

FOREIGN PATENT DOCUMENTS

| | | |
|---|---|---|
| EP | EP 1 167 993 A2 | 1/2002 |
| EP | 1 197 761 A2 | 4/2002 |

(Continued)

OTHER PUBLICATIONS

Yiu, K., et al. "A Low-Cost GPS Receiver for Land Navigation," Global Positioning System, Hewlett-Packard Laboratories, Palo Alto, CA, pp. 44-60, May 1982.

(Continued)

*Primary Examiner* — G. C Issing
(74) *Attorney, Agent, or Firm* — Sterne, Kessler, Goldstein & Fox PLLC

(57) ABSTRACT

Method and apparatus for locating position of a satellite signal receiver is described. In one example, pseudoranges are obtained that estimate the range of a satellite signal receiver to a plurality of satellites. An absolute time and a position are computed using the pseudoranges at a first time. The absolute time is then used to compute another position at a subsequent time. In another example, a plurality of states associated with a satellite signal receiver are estimated, where the plurality of states includes a time tag error state. A dynamic model is then formed relating the plurality of states, the dynamic model operative to compute position of the satellite signal receiver.

18 Claims, 11 Drawing Sheets

(56) References Cited

U.S. PATENT DOCUMENTS

| | | | |
|---|---|---|---|
| 5,365,450 A | | 11/1994 | Schuchman et al. |
| 5,420,592 A | | 5/1995 | Johnson |
| 5,426,665 A | | 6/1995 | Cleverly et al. |
| 5,430,657 A | * | 7/1995 | Kyrtsos .................. 701/226 |
| 5,459,473 A | | 10/1995 | Dempster et al. |
| 5,615,236 A | | 3/1997 | Turney |
| 5,673,256 A | | 9/1997 | Maine |
| 5,726,893 A | | 3/1998 | Schuchman et al. |
| 5,727,018 A | | 3/1998 | Wolf et al. |
| 5,736,960 A | | 4/1998 | Murphy et al. |
| 5,757,916 A | | 5/1998 | MacDoran et al. |
| 5,760,737 A | | 6/1998 | Brenner |
| 5,841,396 A | | 11/1998 | Krasner |
| 5,874,914 A | | 2/1999 | Krasner |
| 5,877,723 A | | 3/1999 | Fan |
| 5,889,492 A | | 3/1999 | Kurby et al. |
| 5,893,044 A | | 4/1999 | King et al. |
| 5,896,304 A | | 4/1999 | Tiemann et al. |
| 5,917,444 A | | 6/1999 | Loomis et al. |
| 5,945,944 A | | 8/1999 | Krasner |
| 5,945,948 A | | 8/1999 | Buford et al. |
| 5,957,982 A | | 9/1999 | Hughes et al. |
| 6,016,117 A | * | 1/2000 | Nelson, Jr. .................. 342/352 |
| 6,028,537 A | | 2/2000 | Suman et al. |
| 6,052,081 A | | 4/2000 | Krasner |
| 6,064,336 A | | 5/2000 | Krasner |
| 6,067,045 A | * | 5/2000 | Castelloe et al. ........ 342/357.09 |
| 6,084,544 A | | 7/2000 | Camp, Jr. |
| 6,133,874 A | | 10/2000 | Krasner |
| 6,134,483 A | | 10/2000 | Vayanos et al. |
| 6,150,980 A | | 11/2000 | Krasner |
| 6,191,731 B1 | | 2/2001 | McBurney et al. |
| 6,211,819 B1 | * | 4/2001 | King et al. ............... 342/357.09 |
| 6,215,441 B1 | | 4/2001 | Moeglein et al. |
| 6,215,442 B1 | | 4/2001 | Sheynblat et al. |
| 6,222,483 B1 | | 4/2001 | Twitchell et al. |
| 6,256,475 B1 | | 7/2001 | Vannucci |
| 6,266,533 B1 | | 7/2001 | Zadeh et al. |
| 6,285,316 B1 | | 9/2001 | Nir et al. |
| RE37,408 E | | 10/2001 | Loomis et al. |
| 6,405,132 B1 | | 6/2002 | Breed et al. |
| 6,411,892 B1 | | 6/2002 | van Diggelen |
| 6,417,801 B1 | | 7/2002 | van Diggelen |
| 6,424,890 B1 | * | 7/2002 | Syrjarinne et al. ............... 701/13 |
| 6,429,812 B1 | | 8/2002 | Hoffberg |
| 6,430,415 B1 | | 8/2002 | Agashe et al. |
| 6,433,739 B1 | | 8/2002 | Soliman |
| 6,438,702 B1 | | 8/2002 | Hodge |
| 6,453,237 B1 | | 9/2002 | Fuchs et al. |
| 6,473,030 B1 | | 10/2002 | McBurney et al. |
| 6,487,499 B1 | | 11/2002 | Fuchs et al. |
| 6,529,159 B1 | | 3/2003 | Fan et al. |
| 6,538,600 B1 | | 3/2003 | Richton et al. |
| 6,542,820 B2 | | 4/2003 | LaMance et al. |
| 6,560,534 B2 | | 5/2003 | Abraham et al. |
| 6,573,799 B1 | | 6/2003 | Akopian |
| 6,618,670 B1 | | 9/2003 | Chansarkar |
| 6,636,740 B1 | | 10/2003 | Ramesh |
| 6,642,884 B2 | | 11/2003 | Bryant et al. |
| 6,734,821 B2 | | 5/2004 | van Diggelen |
| 6,829,535 B2 | | 12/2004 | van Diggelen et al. |
| 6,856,282 B2 | | 2/2005 | Mauro et al. |
| 6,937,187 B2 | | 8/2005 | van Diggelen |
| 6,941,109 B2 | | 9/2005 | Matsushita et al. |
| 7,196,660 B2 | | 3/2007 | Abraham |
| 7,245,253 B2 | | 7/2007 | van Diggelen |
| 7,554,487 B2 | | 6/2009 | Abraham et al. |
| 2002/0005802 A1 | | 1/2002 | Bryant et al. |
| 2002/0024461 A1 | | 2/2002 | Moeglein et al. |
| 2002/0190898 A1 | | 12/2002 | Abraham et al. |
| 2003/0023379 A1 | | 1/2003 | Diggelen et al. |
| 2004/0119639 A1 | | 6/2004 | Gilkes |
| 2004/0203853 A1 | | 10/2004 | Sheynblat |
| 2005/0003833 A1 | | 1/2005 | Younis |
| 2008/0036651 A1 | | 2/2008 | van Diggelen |
| 2010/0066601 A1 | | 3/2010 | Abraham et al. |

FOREIGN PATENT DOCUMENTS

| | | |
|---|---|---|
| EP | 1 248 117 A2 | 10/2002 |
| WO | WO 99/19743 A1 | 4/1999 |
| WO | WO 99/53338 | 10/1999 |
| WO | WO 99/53338 A2 | 10/1999 |
| WO | WO 00/10028 | 2/2000 |
| WO | WO 00/10028 A1 | 2/2000 |
| WO | WO 00/58750 | 10/2000 |
| WO | WO 00/58750 A1 | 10/2000 |
| WO | WO 01/39698 A1 | 6/2001 |
| WO | WO 01/73467 | 10/2001 |
| WO | WO 01/73467 A2 | 10/2001 |
| WO | WO 01/95550 A2 | 12/2001 |
| WO | WO 02/103383 A2 | 12/2002 |
| WO | WO 03/010912 | 2/2003 |
| WO | WO 03/010912 A2 | 2/2003 |

OTHER PUBLICATIONS

Expert Report of Stephen Heppe Regarding Invalidity of U.S. patent Nos. 6,417,801, 6,606,346, 6,651,000, 6,704,651, 6,937,187, and 7,158,080, Feb. 25, 2008.

First Supplemental Report of Dr. Stephen Heppe Regarding Invalidity of U.S. Patent Nos. 6,417,801, 6,606,346, 6,937,187 and 7,158,080, Apr. 4, 2008.

Respondents' (Mio Technology Limited, USA; MiTAC International Corporation; Pharos Science & Applications, Inc.; E-TEN Information Systems Co. Ltd.) First Supplemental Objections and Responses in Common to Global Locate, Inc.'s First Set of Interrogatories (Nos. 22, 23 and 49) and Exhibits 1-5 and 19-22, Aug. 31, 2007.

Respondents' (Mio Technology Limited, USA; MiTAC International Corporation; Pharos Science & Applications, Inc.; E-TEN Information Systems Co. Ltd.) Fifth Supplemental Objections and Responses to Global Locate, Inc.'s First Set of Interrogatories (Nos. 19, 21-23 and 27-28), Apr. 3, 2008.

Melbourne, W.G., et al. "Scientific Applications of GPS on Low Earth Orbiters," Jet Propulsion Laboratory, California Institute of Technology, http://hdl.handle.net/2014/32419, 1994.

Chansarkar, M., et al. "Acquisition of GPS Signals at Very Low Signal to Noise Ratio," ION NTM 2000, Anaheim, CA, pp. 731-737, Jan. 26-28, 2000.

Wu, S.C., et al. "MicroGPS for Low-Cost Orbit Determination," TDA Progress Report 42-131, pp. 1-12, Nov. 15, 1997.

Rebuttal Expert Report of Anthony R. Pratt, Ph.D. Regarding U.S. Patent Nos. 6,704,651, 6,417,801 and 6,937,187, Rebuttal vol. II: The '801 and '187 Patents, Redacted—Non-Confidential Version, Mar. 10, 2008.

Complainants' Notice of Prior Art Pursuant to Ground Rule 5, Certain GPS Devices and Products Containing Same, United States International Trade Commission Investigation No. 337-TA-602, Feb. 15, 2008.

Lin, X. et al. "Enhanced Accuracy GPS Navigation Using the Interacting Multiple Model Estimator," IEEEx-plore, IEEE, pp. 4-1911 through 4-1923, 2001.

Knight, D. T. "Rapid Development of Tightly-Coupled GPS/INS Systems," IEEE AES Systems Magazine, Feb. 1997, pp. 14-18, Feb. 1997.

Kao, M. H., et al. "Multiconfiguration Kalman Filter Design for High-Performance GPS Navigation, " IEEE Transactions on Automatic Control, vol. AC-28, No. 3, Mar. 1983, pp. 304-314.

Supplementary European Search Report received from our European Foreign associate, A.A. Thornton & Co. on Oct. 1, 2004, from corresponding EP Application 01997046.6.

Milliken, R. J., et al., "Principle of Operation of NAVSTAR and System Characteristics," Navigation: Journal of the Institute of Navigation, vol. 25, No. 2, pp. 95-106, Summer 1978.

Aparicio., M., et al. "GPS Satellite and Payload," Global Positioning System: Theory and Applications vol. I, Progress in Astronautics and Aeronautics, vol. 163, Ch. 6, pp. 209-244, 1996.

(56) References Cited

OTHER PUBLICATIONS

Bertiger, W.I., et al., "GPS precise tracking of TOPEXIPOSEIDON: Results and Implications," Journal of Geophysical Research, vol. 99, No. C12, pp. 24, 449-24, 464, Dec. 15, 1994.

Bertiger, W.I., et al. "GPS Precise Tracking of Topexi/Poseidon: Results & Implications," Submitted for Publication to JGR TOPEXI, Poseidon Special Issue, http://hdl.handle.net12014/33763, Nov. 1993.

Chansarkar, M., "Application for Patent—Resolving Time Ambiguity in GPS Using Over-Determined Navigation Solution," U.S. Appl. No. 60/232,738, filed Sep. 15, 2000.

Chansarkar, M., et al. "Acquisition of GPS Signals at Very Low Signal to Noise Ratio," ION NTM 2000, Anaheim CA, pp. 731-737, Jan. 26-28, 2000.

Commission Investigative Staff's Notice of Prior Art, Certain GPS Devices and Products Containing Same, United States International Trade Commission Investigation No. 337-TA-602, Feb. 15, 2008.

Commission Opinion, Certain GPS Devices and Products Containing Same, United States International Trade Commission Investigation No. 337-TA-602, Jan. 27, 2009.

Complainants' First Amended Complaint under Section 337 of the Tariff Act of 1930, as Amended, Certain GPS Devices and Products Containing Same, United States International Trade Commission Investigation No. 337-TA-602, Feb. 8, 2008.

Complainant' Notice of Prior Art Pursuant to Ground Rule 5, Certain GPS Devices and Products Containing Same, United States International Trade Commission Investigation No. 337-TA-602, Feb, 15, 2008.

International Search Report, dated Mar. 17, 2004 for corresponding PCT application, PCT/US03/30872.

Diesposti, Raymond, et al., "Of Mutual Benefit: Merging GPS and Wireless Communications," GPS World, vol. 9, No. 4, pp. 44-48, Apr. 1998.

Diesposti, Raymond, et al., "The Benefits of Integrating GPS, INS and PCS," The Aerospace Corp., ION-GPS-98, Session 01, Receiver Systems and Technology I: New Receiver Architectures & Signal Processing Strategies, Nashville Convention Center, Nashville, Tennessee pp. 327-331, Sep. 15-18, 1998.

Enge. P.K., et al. "Wide Area Augmentation System," Global Positioning System: Theory and Applications vol. II, Progress in Astronautics and Aeronautics, vol. 164, Ch. 4, pp. 117-142, 1996.

EPO Communication Mar. 30, 2010 (Communication from the European Patent Office for European Patent Application No. 03 773 095.9, Eurpean Patent Office, Munich, Germany, mailed on Mar. 30, 2010.

EPO Communication Apr. 16, 2010 (Communication from the European Patent Office for European Patent Application No. 10 001 276.4, Eurpean Patent Office, Munich, Germany, mailed on Apr. 16, 2010).

Expert Report of Stephen Heppe Regarding Invalidity of U.S. patent Nos. 6,417,801, 6,606,146, 6,651,000, 6,704,651, 6,937,181 and 7,158,080, Feb. 25, 2008.

File History—U.S. Appl. No. 10/081,164, Feb. 22, 2002.

First Supplemental Report of Dr. Stephen Heppe Regarding Invalidity of U.S. Patent Nos. 6,417,801, 6,606,346, 6,937,187, and 7,158,080, Apr. 4, 2008.

Francisco, Sherman G., "GPS Operational Control Segment," Global Positioning System: Theory and Applications, Ch. 10, pp. 435-466, 1994.

Garin, T.J., et al. "Wireless Assisted GPS-SiRF Architecture and Field Test Results," ION GPS '99, Nashville, TN, pp. 489-497, Sep. 14-17, 1999.

Initial Determination, Certain GPS Devices and Products Containing Same, United States International Trade Commission Investigation No. 337-TA-602, Public Version, Nov. 25, 2008.

International GPS Service for Geodynamics, 1996 Annual Report, IGS Central Bureau, Nov. 1997.

International GPS Service for Geodynamics, 1997 Technical Reports, IGS Central Bureau, Oct. 1998.

International GPS Service for Geodynamics, 1999 Technical Reports, IGS Central Bureau, pp. 13-164, Nov. 2000.

International GPS Service for Geodynamics, 2000 Technical Reports, IGS Central Bureau, pp. 71-148, Nov. 2001.

International Search Report dated Feb. 20, 2004 for corresponding PCT application, PCT/US03/31222.

Kao, Min H. et al, "Multiconfiguration Kalman Filter Design for High-Performance GPS Navigation," IEEE Transactions on Automatic Control, vol. AC-28, No. 3, Mar. 1983 pp. 304-314.

Kline, Paul A.; "Atomic Clock Augmentation for Receivers using the Global Positioning System," Dissertation for Doctor of Philosophy, Vrginia Polytechnic Institute and State University; Section 2.4.2.1 and Appendix A, 1997.

Knight, Donald T. "Rapid Development of Tightly-Coupled GPS/INS Systems," IEEE AES Systems Magazine Feb. 1997, pp. 14-18.

Lamance, J., et al. "Assisted GPS—Low Infrastructure Approach," GPS World, vol. 13, No. 3, pp. 46-51, Mar. 2002.

Lannelongue, Stephane, et al., "Fast Acquisition Techniques for G.P.S. Receivers," TTC and Navigation Section, European Space Agency (ESA/ESTEC), ION-GPS-98, Session 2B, Land Navigation, Denver, CO, pp. 261-269, Jun. 1-3, 1998.

Lin, Xiangdong et al, "Enhanced Accuracy GPS Navigation Using the Interacting Multiple Model Estimator," IEEExplore, IEEE, pp. 4-1911 through 4-1923, 2001.

Melbourne, W.G., et al. "Scientific Applications of GPS on Low Earth Orbiters," Jet Propulsion Laboratory, California Institute of Technology, http://hdl.handle.net/2014/32419, 1994

Milliken, R. J., et al., "Principle of Operation of NAVSTAR and System Characteristics," Navigation: Journal of the Institute of of Navigation, vol. 25, No. 2, pp. 95-106, Summer 1978.

Mills, David L. "Adaptive Hybrid Clock Discipline Algorithm for the Network Time Protocol," IEEE/ACM Transactions on Networking, vol. 6, No. 5, Oct. 1998, pp. 505-514.

NAVSTAR GPS Space Segment I Navigation User Interfaces, ICD-GPS-200, Jul. 3, 1991.

NAVSTAR GPS, ICD-GPS-200, Revision C, Ocl. 10, 1993, Ocl. 13, 1995, Sep. 25, 1997, Ocl. 1, 1999, Apr. 12, 2000, Jan. 14, 2003.

NAVSTAR GPS.Interface Control Document GPS (200). Jul. 1, 1992.

Neilan, Ruth E., et al., "The International GPS Service: A Global Resource for GPS Applications and Research," Institute of Navigation, ION GPS-97, 10th International Technical Meeting, Kansas City, Missouri, Sep. 16-19, 1997.

Noe, P. S., et al., "A Navigation Algorithm for the Low-Cost GPS Receiver," Navigation: Journal of the Institute of Navigation, vol. 25, No. 2, pp. 258-264, Summer 1978.

Peterson, Capt. Benjamin, et al., "GPS Receiver Structures for the Urban Canyon," U.S. Coast Guard Academy, ION-GPS-95, Session C4, Land Vehicular Applications, Palm Springs, CA, pp. 1323-1332, Sep. 12-15, 1995.

Rebuttal Expert Report of Anthony R. Pratt, Ph.D. Regarding U.S. Patent Nos. 6,704,651, 6,417,801, and 6,937,187, Rebuttal vol. II: The '801 and '187 Patents, Redacted—Non-Confidential Version, Mar. 10, 2008.

Respondent SiRF Technology, Inc.'s First Supplemental Objections and Responses to Global Locate, Inc.'s First Set of Interrogatories (Nos. 22, 23 and 49) and Exhibits 1-5 and 19-22, Aug. 24, 2007.

Respondent SiRF Technology, Inc.'s Sixth Supplemental Objections and Responses To Global Locate, Inc.'s First Set of Interrogatories (Nos. 19, 21-23, and 27-28), Apr. 3, 2008.

Respondents' (Mio Technology Limited, USA; MiTAC International Corporation; Pharos Science & Applications, Inc.; E-TEN Information Systems Co. Ltd.) Fifth Supplemental Objections and Responses to Global Locate, Inc.'s First Set of Interrogatories (Nos. 19, 21-23, and 27-28), Apr. 3, 2008.

Respondents' (Mio Technology Limited, USA; MiTAC International Corporation; Pharos Science & Applications, Inc.; E-TEN Information Systems Co. Ltd.) First Supplemental Objections and Responses to Global Locate, Inc.'s First Set of Interrogatories (Nos. 22, 23, and 49) and Exhibits 1-5 and 19-22, Aug. 31, 2007.

Respondents' First Supplemental Corrected Notice of Prior Art, Certain GPS Devices and Products Containing Same, United States International Trade Commission Investigation No. 337-TA-602, Mar. 4, 2008.

(56) References Cited

OTHER PUBLICATIONS

Respondents' Notice of Prior Art, Certain GPS Devices and Products Containing Same, United States International Trade Commission Investigation No. 337-TA-602, Feb. 15, 2008.
RTCM Recommended Standards for Differential NAVSTAR GPS Service, Version 2.0, RTCM Special Committee No. 104, RTCM Paper 134-89/SC 104-68, Jan. 1, 1990.
Russell, S.S., et al. "Control Segment and User Performance," Navigation Journal of the Institute of Navigation, vol. 25, No. 2, pp. 166-172, Summer 1978.
Schenewerk, Dr. Mark S., et al., "Rapid Turnaround GPS Ephemerides from the National Geodetic Survey," Proceedings of the ION GPS-93, Institute of Navigation, pp. 247-255, 1993.
SiRF v. Broadcom, U.S. Court of Appeals for the Federal. Circuit, 2009-1262, decided Apr. 12, 2010.
Spilker Jr., J.J., et al. "Overview of GPS Operation and Design," Global Positioning System: Theory and Applications vol. I, Progress in Astronautics and Aeronautics, vol. 163, Ch. 2, pp. 29-55, 1996.
Supplementary European Search Report received from our European Foreign associate, A. A. Thornton & Co. on Oct. 1, 2004, from corresponding EPO Application 01997046.6.
Syrjarinne, J., "Time Recovery Through Fusion of Inaccurate Network Timing Assistance with GPS Measurements," Proceedings of the Third International Conference on Fusion, vol. 2, pp. WeD5-3-WeD5-10, Jul. 10-13, 2000.
TIA/EIA Interim Standard, Position Determination Service Standard for Dual Mode Spread Spectrum Systems, TIA/EIA/IS-801, Nov. 1999.
Van Diggelen, F., "Global Locate Indoor GPS Chipset and Services," ION-GPS-2001, Salt Lake City, Utah, pp. 1-7, Sep. 11-14, 2001.
Wu, S.C., et al., "MicroGPS for Low-Cost Orbit Determination," TDA Progress Report 42-131, pp. 1-12, Nov. 15, 1997.
Yiu, K., et al. "A Low-Cost GPS Receiver for Land Navigation," Global Positioning System, Hewlett-Packard Laboratories, Palo Alto, CA, pp, 44-60, May 1982.
Young, L., et al. "GPS Precision Orbit Determination: Measured Receiver Performance," Jet Propulsion Laboratory, California Institute of Technology, http://hdl.handle.net/2014/35887, 1993.
Zhao, Y, "Mobile Phone Location Determination and Its Impact on Intelligent Transportation Systems," IEEE Transaction on Intelligent Transportation Systems, vol. 1, No. 1, Mar. 2000.
Zhao, Y, "Standardization of Mobile Phone Positioning for 3G Systems," IEEE Communications Magazine, Jul. 2002.
Zumberge, J.F., et al., "Ephemeris and Clock Navigation Message Accuracy," Global Positioning System: Theory and Applications, Ch. 16, pp. 585-599, 1994.
Initial Determination in the matter of Certain GPS Devices and Products Containing Same, United States International Trade Commission Investigation No. 337-TA-602, issued Nov. 25, 2008, Washington, DC, 220 pages.
Commission Opinion in the matter of Certain GPS Devices and Products Containing Same, United States International Trade Commission Investigation No. 337-TA-602, issued Jan. 27, 2009, Washington, DC, 29 pages.
International Search Report for corresponding International Patent Application No. PCT/US01/47053, ISA/US, Commissioner for Patents, United States, mailed on Jul. 24, 2002.
International Preliminary Examination Report for corresponding International Patent Application No. PCT/US01/47053, ISA/US, Commissioner for Patents, United States, completed Oct. 2, 2002.
Certain GPS Devices and Products Containing Same, USITC Inv. No. 337-TA-602, vol. 7, 1652-1655, 1663-1672, 1683-1687, 1707-1819, 1829-1841, 1921-1937, 1942-1944, Heritage Reporting Company, Washington, D.C., (May 6, 2008) (Open Session Hearing).
Certain GPS Devices and Products Containing Same, USITC Inv. No. 337-TA-602, vol. 8, 1945-1948, 1960-1986, 2034-2047, 2050-2056, 2060-2082, 2100-2143, 2169-2174, 2206-2209, Heritage Reporting Company, Washington, D.C., (May 7, 2008) (Open Session Hearing).
Certain GPS Devices and Products Containing Same, USITC Inv. No. 337-TA-602, vol. 9, 2210-2213, 2409-2465, Heritage Reporting Company, Washington, D.C., (May 8, 2008) (Open Session Hearing).
Certain GPS Devices and Products Containing Same, USITC Inv. No. 337-TA-602, vol. 10, 2466-2469, 2481-2509, 2545-2578, 2590-2592, 2617-2646, 2673-2709, Heritage Reporting Company, Washington, D.C., (May 9, 2008) (Open Session Hearing).
Certain GPS Devices and Products Containing Same, USITC Inv. No. 337-TA-602, vol. 11, 2710-2713, 2760-2761, 2804-2837, 2845-2865, 2885-2894, 2904-2939, 2946-2950, Heritage Reporting Company, Washington, D.C., (May 12, 2008) (Open Session Hearing).
Certain GPS Devices and Products Containing Same, USITC Inv. No. 337-TA-602, vol. 12, 3007-3010, 3059-3063, 3078-3096, 3284-3384, Heritage Reporting Company, Washington, D.C., (May 13, 2008) (Open Session Hearing).

\* cited by examiner

METHOD AND APPARATUS FOR PROCESSING OF SATELLITE SIGNALS WITHOUT TIME OF DAY INFORMATION

CROSS-REFERENCE TO RELATED APPLICATIONS

This application is a continuation of co-pending U.S. patent application Ser. No. 11/077,309, filed on Mar. 10, 2005; which is a Division of U.S. patent application Ser. No. 10/461,890, filed on Jun. 13, 2003, now U.S. Pat. No. 6,937,187 issued on Aug. 30, 2005; which is continuation-in-part of U.S. patent application Ser. No. 10/190,745, filed Jul. 8, 2002, now U.S. Pat. No. 6,734,821 issued on May. 11, 2004; which is a continuation-in-part of U.S. patent application Ser. No. 09/715,860, filed Nov. 17, 2000, now U.S. Pat. No. 6,417,801, issued Jul. 9, 2002; each of which are incorporated by reference herein in their entireties.

BACKGROUND OF THE INVENTION

1. Field of the Invention

The invention relates to satellite-based position location and, more particularly, the invention relates to a method and apparatus for time-free processing of global positioning system (GPS) signals.

2. Description of the Related Art

Global Positioning System (GPS) receivers normally determine their position by computing time delays between transmission and reception of signals transmitted from satellites and received by the receiver on or near the surface of the earth. The time delays multiplied by the speed of light provides the distance from the receiver to each of the satellites that are in view of the receiver. The GPS satellites transmit to the receivers satellite-positioning data, so called "ephemeris" data. In addition to the ephemeris data, the satellites transmit to the receiver absolute time information associated with the satellite signal, i.e., the absolute time signal is sent as a second of the week signal. This absolute time signal allows the receiver to unambiguously determine a time tag for when each received signal was transmitted by each satellite. By knowing the exact time of transmission of each of the signals, the receiver uses the ephemeris data to calculate where each satellite was when it transmitted a signal. Finally, the receiver combines the knowledge of satellite positions with the computed distances to the satellites to compute the receiver position.

The process of searching for and acquiring GPS signals, and reading the ephemeris and related data, including absolute time, for a multiplicity of satellites is time consuming and introduces unacceptable delays in computing the receiver position. In addition, in many situations, there may be blockage of the satellite signals. In these cases the received signal level can be too low to demodulate and derive the satellite data without error. However, in these degraded signal situations, the receiver is capable of tracking the satellite signals, and measuring time delays (and hence distance), if an external source of ephemeris and absolute time is available.

Several innovations have been made to provide "GPS Aiding" that consists of external sources of ephemeris (or equivalent) data and absolute time information. The aiding information is transmitted to the GPS receiver using some alternative form of communication (usually wireless, such as cellular data channels). Thanks to the use of GPS Aiding, GPS receivers can operate in areas where signal levels are too low for traditional GPS to function properly.

All GPS Aiding, thus far invented, requires accurate external knowledge of the absolute time, so that the satellite positions can be accurately determined. The absolute time is required to an accuracy of between 1 millisecond and 10 milliseconds. Unfortunately, there are desired implementations of GPS Aiding where absolute time cannot easily be obtained to this accuracy at the GPS receiver. For example: the AMPS cellular phone system does not support time information; nor (currently) does the North American TDMA cellular phone system. The GSM cellular phone system supports timing information, but may have different time references in different geographical regions. In these situations it is desirable to provide a method for computing GPS receiver position without knowing the absolute time.

More specifically, Global Positioning System (GPS) receivers receive GPS signals transmitted from orbiting GPS satellites containing unique pseudo-random noise (PN) codes. The GPS receivers determine the time delays between transmission and reception of the signals by comparing time shifts between the received PN code signal sequence and internally generated PN signal sequences.

Each transmitted GPS signal is a direct sequence spread spectrum signal. The signals available for commercial use are provided by the Standard Positioning Service. These signals utilize a direct sequence spreading signal with a 1.023 MHz spread rate on a carrier at 1575.42 MHz (the L1 frequency). Each satellite transmits a unique PN code (known as the C/A code) that identifies the particular satellite, and allows signals transmitted simultaneously from several satellites to be received simultaneously by a receiver with very little interference of any one signal by another. The PN code sequence length is 1023 chips, corresponding to a 1 millisecond time period. One cycle of 1023 chips is called a PN frame. Each received GPS signal is constructed from the 1.023 MHz repetitive PN pattern of 1023 chips. At very low signal levels the PN pattern may still be observed, to provide unambiguous time delay measurements, by processing, and essentially averaging, many PN frames. These measured time delays are called "sub-millisecond pseudoranges", since they are known modulo the 1 millisecond PN frame boundaries. Once the absolute time delay can be calculated, by resolving the integer number of milliseconds associated with each delay to each satellite, then one has true, unambiguous, pseudoranges. The process of resolving the unambiguous pseudoranges is known as "integer millisecond ambiguity resolution".

A set of four pseudoranges together with a knowledge of the absolute times of transmissions of the GPS signals and satellite positions at those absolute times is sufficient to solve for the position of the GPS receiver. The absolute times of transmission are broadcast from the satellites in the Navigation Message, which is superimposed on the 1.023 MHz PN code at a lower, 50 Hz, data rate. This 50 Hz signal is a binary phase shift keyed (BPSK) data stream with bit boundaries aligned with the beginning of the PN frame. There are exactly 20 PN frames per data bit period (20 milliseconds). The 50 Hz signal contains data bits describing the GPS satellite orbits, satellite clock corrections, time of week information, and other system parameters.

The absolute times associated with the satellite transmissions are determined in conventional GPS receivers by reading the Time of Week (TOW) data in the Navigation Message of the GPS signal. In the standard method of time determination, a conventional GPS receiver decodes and synchronizes to the 50 baud data stream. The 50 baud signal is arranged into 30-bit words grouped into subframes of 10 words, with a length of 300 bits and a duration of six seconds. Five subframes comprise a frame of 1500 bits and a duration of 30 seconds, and 25 frames comprise a superframe with a duration of 12.5 minutes. A superframe contains the complete Navigation Message. The data bit subframes that occur every six seconds contain bits that provide the TOW to six second resolution. The 50 baud data stream is aligned with the C/A code transitions so that the arrival time of a data bit edge (on a 20 ms interval) resolves the absolute transmission time to the nearest 20 milliseconds. Precision synchronization to bit boundaries can resolve the absolute transmission time to one millisecond or less.

The absolute times associated with the satellite signals are determined in Wireless Aided-GPS receivers by having an external timing source that is calibrated to GPS time then using this time to provide a precise time tag at the time of reception of the satellite signal. The time of reception minus the pseudorange gives the absolute time of transmission for each satellite (with the pseudorange expressed in time units, reflecting the transmission-reception time delay).

The absolute times of transmission are needed in order to determine the positions of the satellites at the times of transmission and hence to determine the position of the GPS receiver. GPS satellites move at approximately 3.9 km/s, and thus the range of the satellite, observed from the earth, changes at a rate of at most ±800 m/s. Absolute timing errors result in range errors of up to 0.8 m for each millisecond of timing error. These range errors produce a similarly sized error in the GPS receiver position. Hence, absolute time accuracy of 10 ms is sufficient for position accuracy of approximately 10 m. Absolute timing errors of much more than 10 ms will result in large position errors, and so typical GPS receivers have required absolute time to approximately 10 millisecond accuracy or better.

Note that absolute timing errors also introduce errors as a result of the GPS satellite clock drift, but these are so much smaller than the satellite position error that they can be ignored for the purposes of this explanation (GPS clocks drift typically less than 0.1 nanoseconds per second, and the observed range to the satellite is affected by the GPS clock drift multiplied by the speed of light, this error is less than 0.03 m/s, about 25 thousand times smaller than errors caused by changes in satellite position).

There is another time parameter closely associated with GPS positioning, this is the sub-millisecond offset in the time reference used to measure the sub-millisecond pseudorange. This offset affects all the measurements equally, and for this reason it is known as the "common mode error".

The common mode error should not be confused with the absolute time error. As discussed above, an absolute time error of 1 millisecond leads to range errors of up to 0.8 meters while an absolute time error of 1 microsecond would cause an almost unobservable range error of less than 1 millimeter. However, a common mode error of 1 microsecond causes a pseudorange error of 1 microsecond multiplied by the speed of light, that is 300 meters.

Because common mode errors have such a large effect on pseudoranges, and because it is practically very difficult to calibrate the common mode error, traditional GPS receivers treat the common mode error as an unknown that must be solved for, along with position, once sufficiently many pseudoranges have been measured at a particular receiver. However, no traditional GPS receivers solve for absolute time error instead relying on the fact that they know absolute time to the required accuracy (of 10 milliseconds or better).

Therefore, a need exists in the art for a method and apparatus that processes GPS signals without using absolute time.

SUMMARY OF THE INVENTION

The present invention is a method and apparatus for computing GPS receiver position without using absolute time information transmitted by a satellite or by an alternative source of timing available at the GPS receiver. In an embodiment of the invention, the GPS receiver is contained in an integrated receiver that also includes a wireless communication transceiver, but does not have access to an accurate source of absolute time information. The wireless transceiver communicates through a wireless network to a server. The GPS receiver measures satellite pseudoranges and uses the wireless communication transceiver to send the pseudoranges to the server. The server fits the pseudoranges to a mathematical model in which the GPS receiver position and the absolute time are unknown parameters. The server then computes a position and absolute time that best fit the model, thus yielding the correct position for the GPS receiver, and the absolute time at which the pseudorange measurements were made.

In another embodiment, pseudoranges are obtained that estimate the range of a satellite signal receiver to a plurality of satellites. An absolute time and a position are computed using the pseudoranges at a first time. The absolute time is then used to compute another position at a subsequent time. In yet another embodiment, a plurality of states associated with a satellite signal receiver are estimated, where the plurality of states includes a time-tag error state. A dynamic model is then formed relating the plurality of states, the dynamic model operative to compute position of the satellite signal receiver.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

The invention is a method and apparatus for determining position and time in a global positioning system (GPS) without having access, at the GPS receiver, to absolute time information. In the following description, for purposes of explanation, numerous specific details are set forth in order to provide a thorough understanding of the present invention. It will be evident, however, to one skilled in the art that the present invention may be practiced without these specific details.

Figure 1:
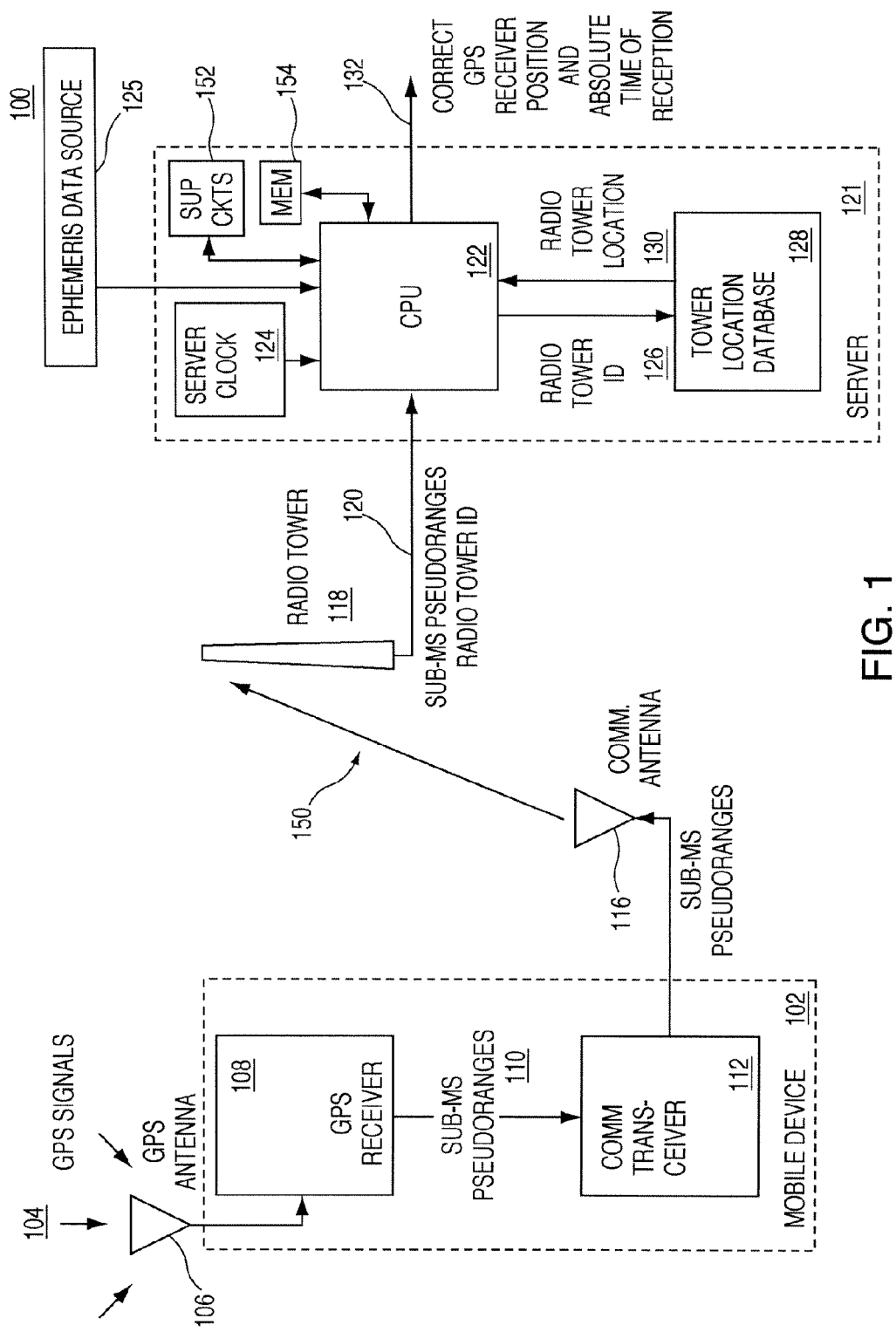
FIG. 1 depicts a block diagram of apparatus for computing a GPS receiver location without knowledge of absolute time.

FIG. 1 depicts one embodiment of the present invention comprising an integrated mobile receiver 102 coupled to a server 121 via a wireless link 150. A GPS receiver 108 is contained in the integrated receiver 102 along with a wireless communication transceiver 112. The GPS receiver 108 measures only sub-millisecond pseudoranges with respect to GPS satellites that are in view of the receiver 108, and then sends these sub-millisecond pseudo-ranges to a server 121 using a wireless communication link 150. The server 121 forms an approximate, a-priori estimate of the GPS receiver position from the known location of a wireless tower 118 used to receive the wireless communication. The server 121 also allocates a time tag from its own real time clock, thus creating an a-priori estimate of the absolute time at which the GPS receiver 108 received the GPS signals from the satellites. If the a-priori position is within 100 km of the true position, and the a-priori absolute time of reception is within one minute of the true (unknown) time of reception, then the server 121 can resolve the integer milliseconds, thus turning the sub-millisecond pseudoranges into true pseudoranges.

Next, the server 121 uses the pseudoranges to solve for the unknown receiver position and absolute time. The server comprises a central processing unit (CPU) 122, a server clock 124, a tower location database 128, CPU support circuits 152, and memory 154. The support circuits comprise well-known circuits that facilitate operation of the CPU such as clock circuits, cache, power supplies, I/O interface circuits, and the like. The memory 154 may be random access memory, read only memory, removable storage, hard disk storage, or any combination of these memory devices.

In one embodiment of the invention, the common mode error is assumed to be totally unknown at the server 121. In the one embodiment of the invention, the server 121 assumes an a-priori common mode error of zero, although it will be understood that any other a-priori common mode error could be used, with no change in the results. With the five a-priori estimates of the unknown parameters (3 coordinates of position, 1 absolute time, 1 common mode error) the server 121 creates a mathematical model relating the measured pseudo-ranges and a-priori information to the unknown parameters. The mathematical model can be written as a linear equation, which, when solved, yields the correct position and absolute time.

More specifically, GPS signals 104 from a plurality of satellites (not shown) are received at the GPS antenna 106. The received signals are coupled to the GPS receiver 108. The GPS receiver 108 processes the GPS signals to form sub-millisecond pseudoranges on path 110, which are coupled to the communication transceiver 112 and transmitted from the communication antenna 116 through a wireless network such as a cellular telephone network. The transmission from the integrated receiver 102 is received by a nearby radio tower 118, e.g., a cellular telephone tower. The sub-millisecond pseudoranges and the radio tower ID are sent from said radio tower 118 to the server 121. In the server 121 the server clock 124 is used to provide a time-tag when the sub-millisecond pseudoranges are received at the server. The server 121 passes the radio tower ID along path 126 to a tower location database 128, and extracts a location for the tower from the database 128. The tower location is coupled to the CPU 122 along path 130.

The satellite ephemeris data, for all satellites represented by the sub-millisecond pseudorange data, is provided to the server from some external source 125 (such as another GPS receiver located in the vicinity of the server with a clear view of the sky, or some other source such as a network of GPS receivers). Note that, for simplicity, the term "ephemeris" is used to mean the satellite orbital parameters, as well as the satellite clock parameters. The CPU 122 of the server 121 combines the sub-millisecond pseudoranges, radio tower location, server time, and ephemeris to form the correct GPS receiver position and absolute time of reception of signals at the GPS receiver 108.

The apparatus above assumes that the GPS receiver 108 is not capable of reliably receiving the absolute time information and ephemeris data, i.e., the GPS receiver is used indoors, such that the processing of ephemeris data is accomplished in the server 121. However, in some instances, rather than having the pseudo range data supplied to the server, the server (or some other source) can supply the ephemeris data and clock signal to the mobile device 102 and the mobile device can perform the position calculation. In such an embodiment of the invention, a CPU and clock (similar to 122 and 124) are located in the mobile device 102 to facilitate signal processing in the same manner as is described with respect to the server 121.

Figure 2:
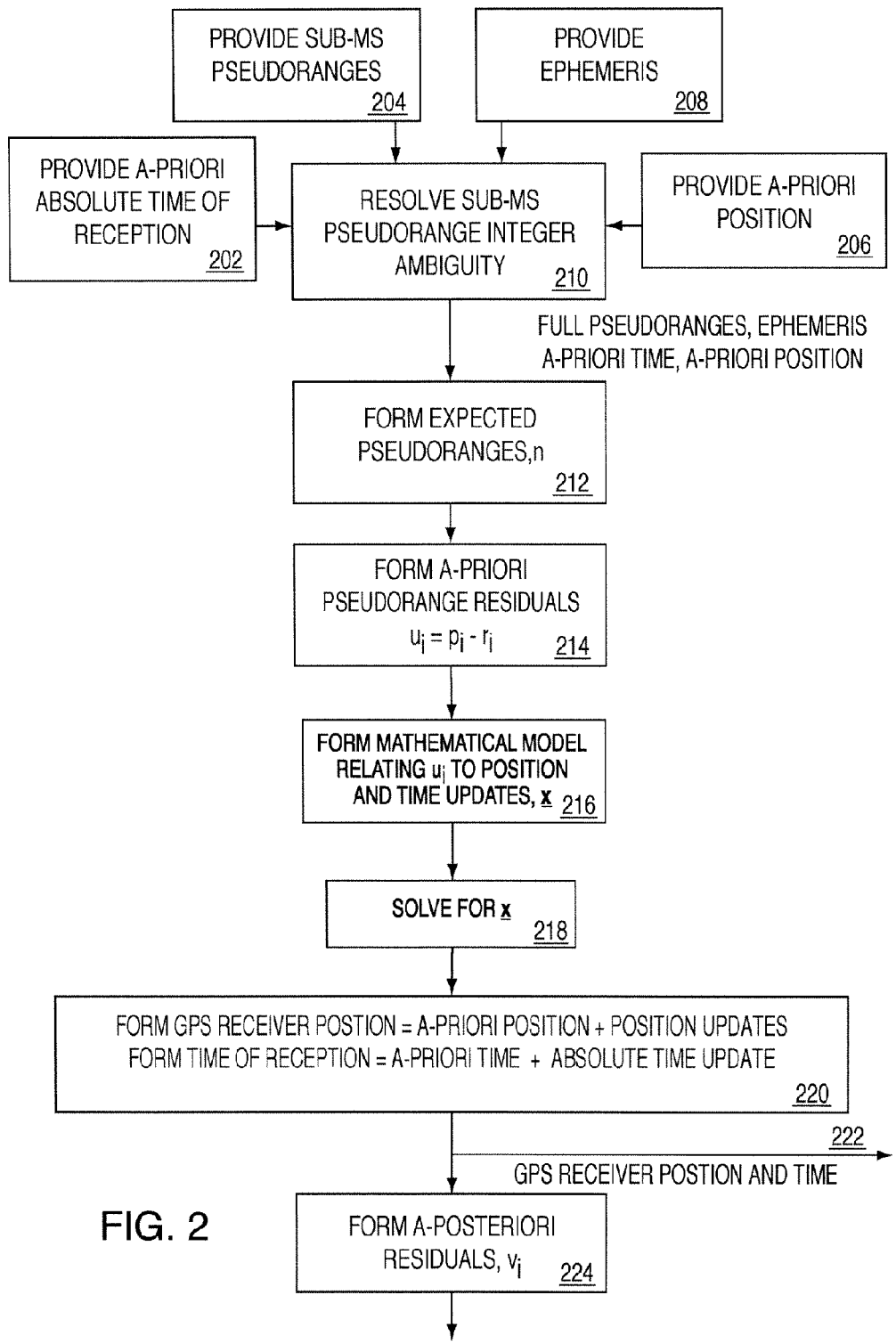
FIG. 2 depicts a flow diagram representing the operation of the apparatus of FIG. 1.

FIG. 2 is a flowchart illustration of the process 200 that is performed by the server CPU 122 of FIG. 1. At step 202, the server clock signal is used to provide an a-priori estimate of the absolute time of reception of the GPS signals at the GPS receiver. It will be understood that the use of the server clock is one embodiment used to exemplify the current invention and, in general, the a-priori estimate of time could come from a time source other than the server clock. The present invention is applicable irrespective of the source, or quality, of the a-priori estimate of absolute time. To simplify the exposition, this particular embodiment is assumed to have a server clock that provides a time tag within one minute of the actual absolute time of reception of the GPS signals at the GPS receiver. It will be understood that this simplifying assumption, while often true in practice, is not a necessary part of the invention, and has been used here only to simplify the explanation of the invention. Later in this specification, this simplifying assumption is removed.

At step 206, the tower location is provided to the CPU as an a-priori estimate of the GPS receiver position. It will be understood that the use of the tower location is just one embodiment of any number of a-priori positions that could be used (for example: a previously calculated position for the same GPS receiver 108 could be used as an a-priori position, or a combination of positions of recently used towers, or the a-priori position could simply be guessed). The present invention is applicable irrespective of the source, or quality, of that a-priori position. To simplify the exposition, this particular embodiment is assumed to have an a-priori position that is within 100 km of the true position of the GPS receiver 108. It will be understood that this simplifying assumption, while often true in practice, is not a necessary part of the invention, and has been used here only to simplify the explanation of the invention. Later in this specification this simplifying assumption is removed.

At step 204 and 208, the sub-millisecond pseudoranges and ephemeris for the appropriate satellites that are in view of GPS receiver are also provided as inputs to the process 200.

At step 210, the sub-millisecond pseudorange integers are resolved by a process described below with respect to FIG. 3. Having resolved the sub-millisecond pseudorange integers, the process creates full pseudoranges.

At step 212, the expected pseudoranges are formed. These expected pseudoranges are the pseudoranges that would be measured if all the a-priori parameters (a-priori position, a-priori absolute time of measurement, and a-priori common mode error) were in fact the actual values of these parameters. The expected pseudoranges are denoted $r_i$, the index i denotes the appropriate satellite.

At step 214, the a-priori pseudorange residuals are formed, these residuals are defined as the difference between the measured pseudoranges (denoted $\rho_i$) and the expected pseudoranges ($r_i$). The a-priori pseudorange residuals are denoted $u_i$.

At step 216 a mathematical model is formed, relating $\underline{u}$ to $\underline{x}$, where $\underline{u}$ is a vector of $u_i$ and $\underline{x}$ is a vector of the updates to the a-priori values of position, common-mode error, and absolute time of reception:

$$\underline{u} = \begin{bmatrix} u_1 \\ u_2 \\ \vdots \\ u_n \end{bmatrix},$$

where n is the number of pseudoranges. The pseudoranges are expressed in units of length (e.g. meters).

$$\underline{x} = \begin{bmatrix} x \\ y \\ z \\ t_C \\ t_S \end{bmatrix}.$$

The position updates, x, y, z, are expressed in units of length (e.g. meters) and the time updates $t_C$, $t_S$ are in units of time (e.g. seconds).

An embodiment of a mathematical model relating these two vectors is a Taylor series, where the first term in the series is the first derivative of $\underline{u}$ with respect to $\underline{x}$, the second term contains the second derivative, and so on. In one embodiment of the process, the invention uses a linearized model that keeps only the first derivative in the Taylor series. This gives the following equation relating $\underline{u}$ to $\underline{x}$:

$$\underline{u} = \begin{bmatrix} u_1 \\ \vdots \\ u_n \end{bmatrix}$$

$$= \begin{bmatrix} \partial\rho_1/\partial x & \partial\rho_1/\partial y & \partial\rho_1/\partial z & \partial\rho_1/\partial t_C & \partial\rho_1/\partial t_S \\ \vdots & \vdots & \vdots & \vdots & \vdots \\ \partial\rho_n/\partial x & \partial\rho_n/\partial y & \partial\rho_n/\partial z & \partial\rho_n/\partial t_C & \partial\rho_n/\partial t_S \end{bmatrix} \begin{bmatrix} x \\ y \\ z \\ t_C \\ t_S \end{bmatrix}$$

$$= \begin{bmatrix} \partial\rho_1/\partial x & \partial\rho_1/\partial y & \partial\rho_1/\partial z & c & -\dot{\rho}_1 \\ \vdots & \vdots & \vdots & \vdots & \vdots \\ \partial\rho_n/\partial x & \partial\rho_n/\partial y & \partial\rho_n/\partial z & c & -\dot{\rho}_n \end{bmatrix} \begin{bmatrix} x \\ y \\ z \\ t_C \\ t_S \end{bmatrix}$$

$$= H\underline{x}$$

The particular values of $\partial\rho_i/\partial x$, $\partial\rho_i/\partial y$, and $\partial\rho_i/\partial z$ depend on the coordinate system used to describe the a-priori position. These terms in the first three columns of the matrix H are well known in the art, and further explanation is not required. The fourth column of the matrix is c, the speed of light, this part of the model is also standard in the art. The novel aspect of this invention requires the inclusion of the fifth column in the matrix. This fifth column exactly models the relationship between the unknown error in the a-priori estimate of absolute time, and the measured pseudoranges. Furthermore the terms in this column are the rate of change of the pseudoranges with respect to time and can be exactly calculated from the ephemeris data. Hence every term in the matrix H is known and, provided there are five or more pseudoranges available at the GPS receiver, the values of $\underline{x}$ can be calculated using linear algebra.

At step 220, the GPS receiver position is computed by adding the updates x,y,z, to the a-priori position, and the absolute time of reception is formed by adding the update $t_S$ to the a-priori time of reception. If the a-priori position and a-priori absolute time were close enough to the true position and true absolute time, then one pass through the process 200 will yield results to the required accuracy. However, if the first pass through the process 200 does not immediately converge on the required accuracy, then the result 222 is used to form a new a-priori time of reception estimate for step 202 and a new a-priori position estimate for step 206, and the process 200 is repeated until the result converges on the correct result (typically very few iterations are required because the linearization using the first order Taylor series is a very good mathematical description of the complete, non-linear, system, thanks to the fact that the satellite ranges are so much further from the earth than the error in the a-priori position).

It will be understood that the Taylor series is just one example of a mathematical model relating the unknown position and absolute time to the measured pseudoranges. The present invention is equally valid with other models, such as non-linear models, which can be solved through techniques such as iteratively fitting the unknown parameters until an acceptable solution is obtained.

If, as assumed above, the a-priori position and a-priori absolute time are within 100 km and 1 minute respectively, then the result 222 will be correct. However, if the a-priori position and time are not known within these limits, then the incorrect integers may be formed at step 210 and the incorrect result 222 may be obtained. In this case the a-posteriori residuals, formed at step 224, will be used, as described below with respect to FIG. 4, to detect this errant condition and then different a-priori values will be used.

Figure 3:
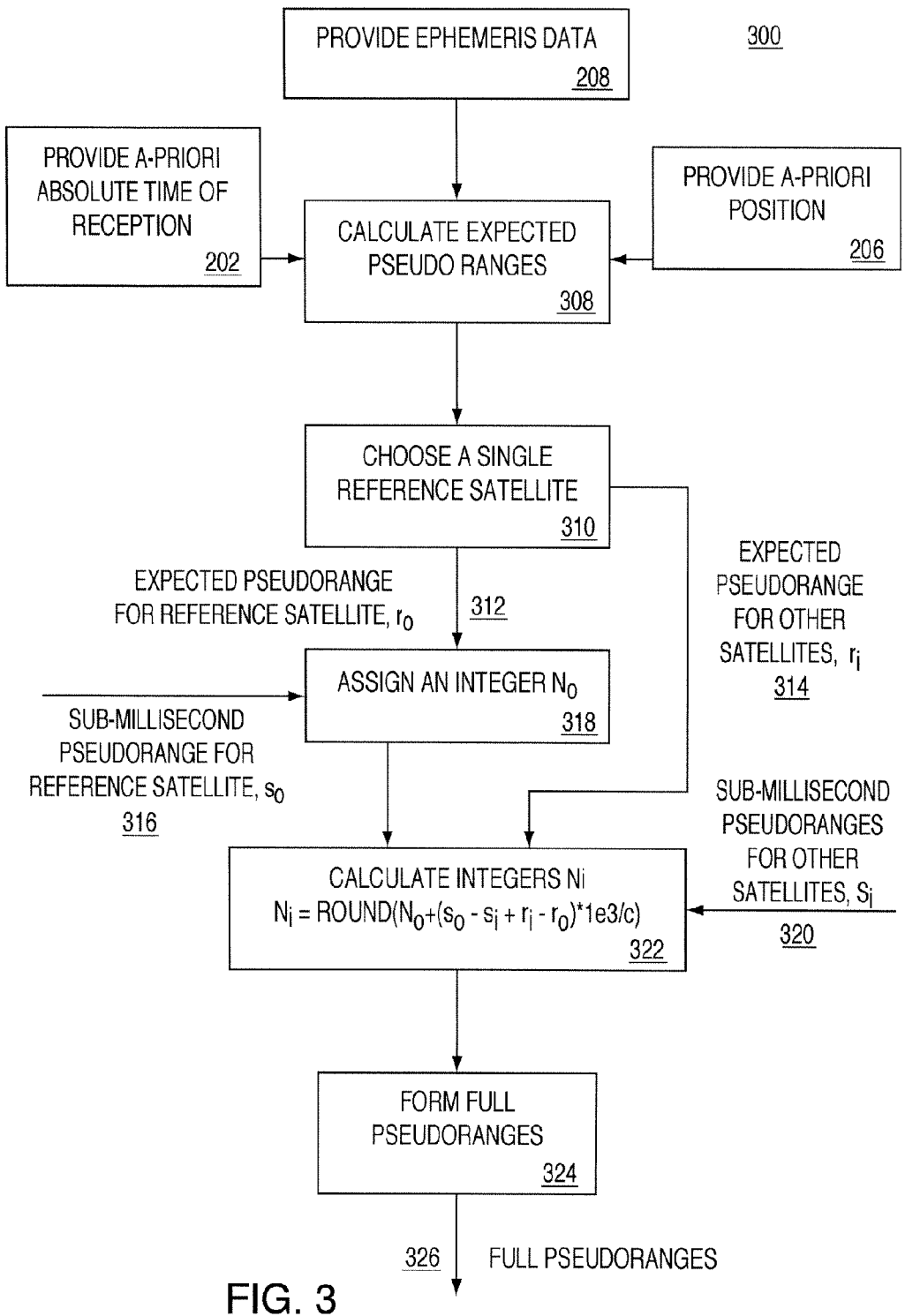
FIG. 3 depicts a flow diagram representing a method of computing pseudoranges in accordance with the invention.

FIG. 3 is a flowchart of an illustrative process 300 that resolves the sub-millisecond pseudorange integers (step 210 of FIG. 2). To simplify the exposition, this particular embodiment is assumed to have an a-priori position that is within 100 km of the true position of the GPS receiver, and an a-priori absolute time estimate that is within one minute of the true absolute time of reception at the GPS receiver. It will be understood that these simplifying assumptions, while often true in practice, are not a necessary part of the invention, and have been used here only to simplify the explanation of this embodiment of the invention. In the description relating to FIG. 4, FIG. 5, and FIG. 6, these simplifying assumptions are removed.

At step 308, the process 300 calculates the expected pseudoranges using ephemeris data (provided in step 208) for the satellites along with the a-priori absolute time of reception (provided in step 202) and the a-priori position (provided in step 206). As done throughout this specification, the term ephemeris is used to mean the satellite orbital parameters as well as the satellite clock parameters.

At step 310, a single satellite is chosen as a reference satellite. In the preferred embodiment the satellite with the highest elevation angle (from the a-priori position) is chosen as the reference, but it will be understood that it is not important which satellite is used as the reference. The expected pseudorange for the reference satellite is denoted $r_0$ (path 312). The expected pseudoranges for the other satellites are denoted $r_i$ (path 314).

At step 318, an integer is assigned to the reference satellite. The integer must satisfy the equation:

$$N_0 * c/10^3 + s_0 - t_C = r_0 - e_0,$$

where c is the speed of light, expressed in m/s, $t_C$ is the common mode error, and $e_0$ is the error in the expected pseudorange introduced by the combined errors in the a-priori position and a-priori absolute time.

Those skilled in the art will understand that an arbitrary integer may be assigned, since in the following discussion it is seen that the common mode error will absorb any errors made in this integer, as long as exactly equal errors are made in all the other integers. The integer $N_0$ is assigned according to the following equation:

$$N_0 = \text{round}((r_0 - s_0) * 10^3/c).$$

At step 322, the integer millisecond values for the remaining satellites are calculated using the sub-millisecond pseudoranges 320 for all the satellites along with $N_0$. Whatever value of $N_0$ was chosen above implies an associated common mode error $t_C$. The values of $N_i$ are chosen to satisfy the following equation, which relates $N_i$, the measured sub-millisecond pseudorange ($s_i$), the expected pseudorange ($r_i$), and the common mode error ($t_C$).

$$N_i * c/10^3 + s_i - t_C = r_i - e_i,$$

where, $e_i$ is the error in the expected pseudorange introduced by the combined errors in the a-priori position and a-priori absolute time. In the preferred approach, the corresponding equation for $N_0$ is subtracted from the above equation, this exactly cancels the term $t_C$, since this term is common (by definition) for all satellites. This yields the following expression for $N_i$ $$N_i = \text{round}(N_0(s_0 - s_i + r_i - r_0) * 10^3/c).$$

The above equations represent one embodiment of a process to calculate the integers. It will be understood that any expression may be used to compute these integers, provided the relationship to $t_C$ is consistently maintained for all the integers.

In the above description the assumption was made that the a-priori position was within 100 km of the true position, and the a-priori absolute time was within 1 minute of the true time. For all GPS satellites, the maximum pseudorange rate is ±800 m/s. Thus the maximum value of the error term $e_i$ will be 100 km+60 s*0.8 km/s=148 km. This is less than half of one C/A code millisecond epoch (i.e., less than half of one integer millisecond) and the rounding operation used above will always yield the correct integers. In the disclosure with respect to FIG. 4, FIG. 5, FIG. 6, these two restrictions on a-priori position accuracy and a-priori time accuracy are removed.

If the a-priori position is not known to within 100 km, it will nonetheless be known to some finite accuracy limit. Similarly, if the a-priori absolute time is not known to within 1 minute it will be nonetheless be known to some finite accuracy limit. As described in the processes 200 and 300, any a-priori position and time estimate within the 100 km and 1 minute constraints will yield the correct integers, correct GPS receiver position, and correct absolute time. In an embodiment of the current invention, the space of all possible a-priori positions is divided into a 100 km×100 km lat-lon grid, with altitude assigned from a look-up table of topographical altitudes. Similarly the space of all possible a-priori absolute times is divided into 1-minute segments. This yields a set of all possible a-priori positions and times. The process 200 is used iteratively, with each of the possible a-priori position and time values from the set. When an a-priori position and time is found within 100 km and 1 minute of truth, then the a-posteriori residuals will be small, and the correct GPS receiver position and absolute time will be computed, as described above.

Figure 4:
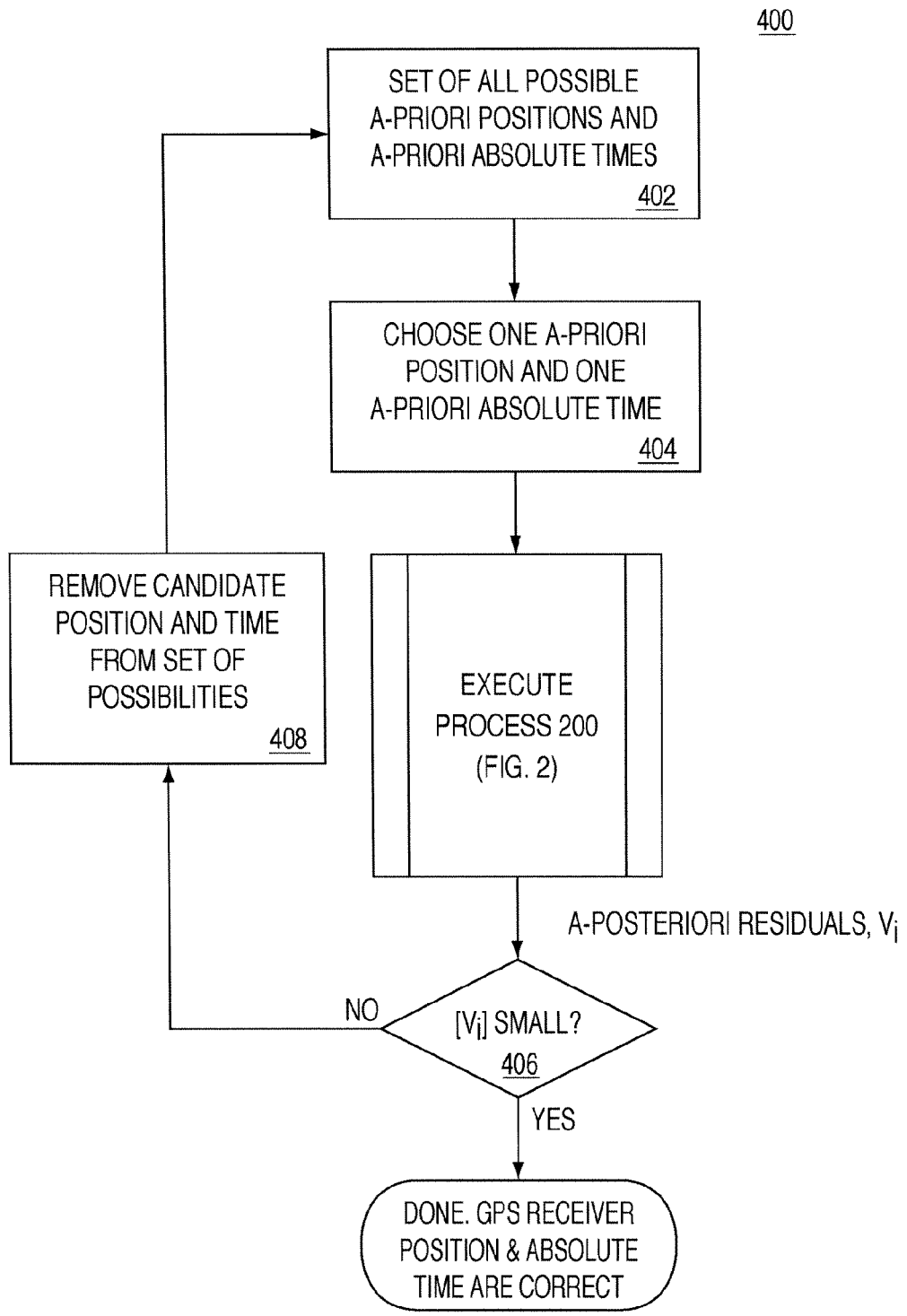
FIG. 4 depicts a flow diagram representing a method of computing receiver position and absolute time in an alternative embodiment of the invention.

An embodiment of this process 400 is shown in FIG. 4. At step 402, all possible a-priori positions and residuals are formed into a set. In one embodiment the set is organized as a 100 km×100 km grid, with altitudes assigned from a lookup table of topographical heights, and with time segmented into 1-minute segments. This is a convenient representation because, as discussed above, the combination of a 100 km grid plus the maximum pseudorange rate times 1-minute gives a maximum possible estimated error of just less than half a millisecond of range, which is necessary for the integer resolution process 300 to select the correct integers. However it will be understood that any number of different methods may be used to organize the set of all possible a-priori values, including creating new elements of the set dynamically, based on the results obtained from previously used values.

At step 404, the process 400 selects one possible a-priori position and time combination. These values are used in the process 200. At step 406, the process 400 examines the a-posteriori residuals that are produced in step 224 of FIG. 2. If the correct GPS receiver position and absolute time have been calculated, then the magnitude of the residuals will be small (that is, of the same order as the pseudorange measurement errors—tens of meters). If the a-priori position and time were far enough away from the truth that the integer ambiguities were not correctly resolved, then the residuals will be large (that is, of the order of one millisecond epoch—many kilometers). If the residuals are large then the candidate a-priori position and time are incorrect and they are removed from the set of possibilities. The process 400 is iterated until the correct position and absolute time are calculated.

It will be understood by those skilled in the art that even if the absolute time is available at the GPS receiver, the process of integer ambiguity resolution has traditionally required an initial estimate of position close enough to the true position for the integers to be uniquely defined by said initial estimate. The current invention provides a novel means of computing the correct integers without requiring an accurate initial estimate of position.

Figure 5A:
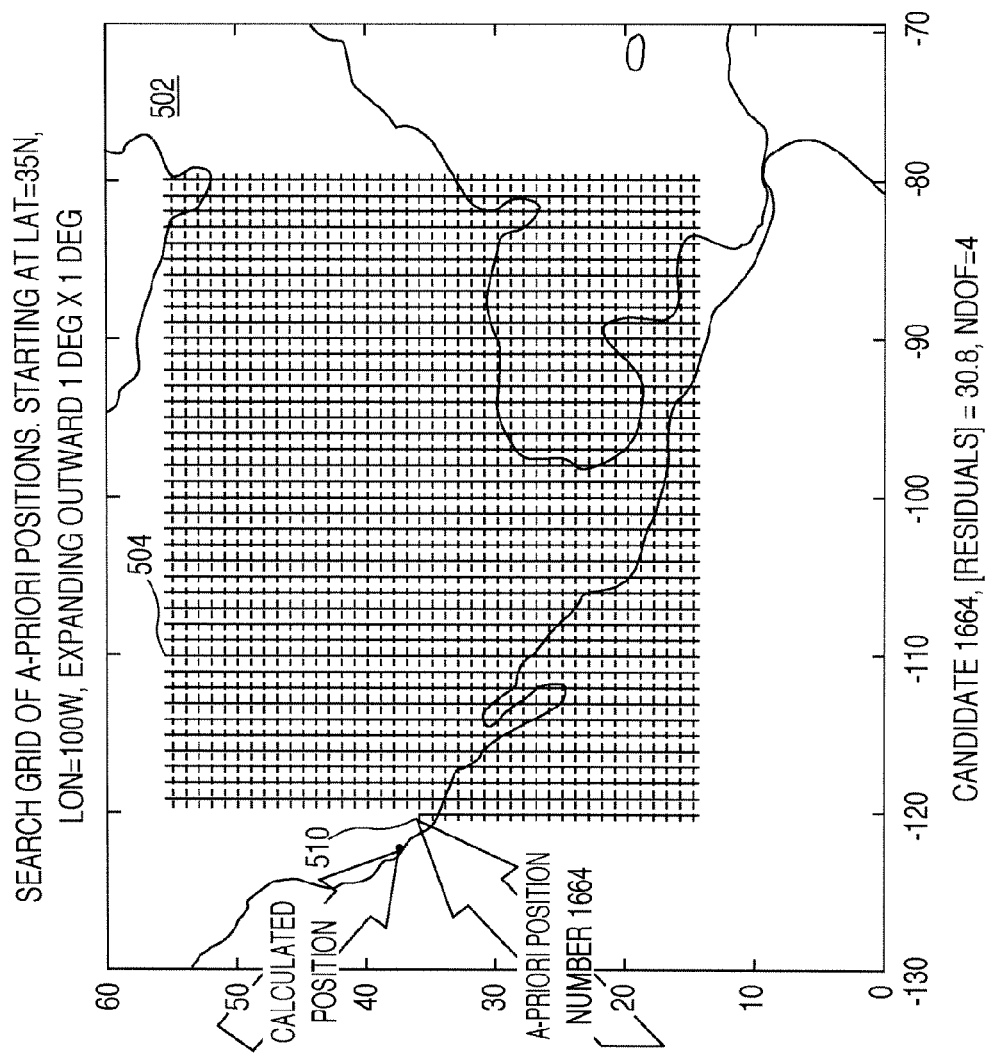
FIGS. 5A and 5B graphically depict a grid (5A) used for producing the residual magnitudes (5B) of position error.
Figure 5B:
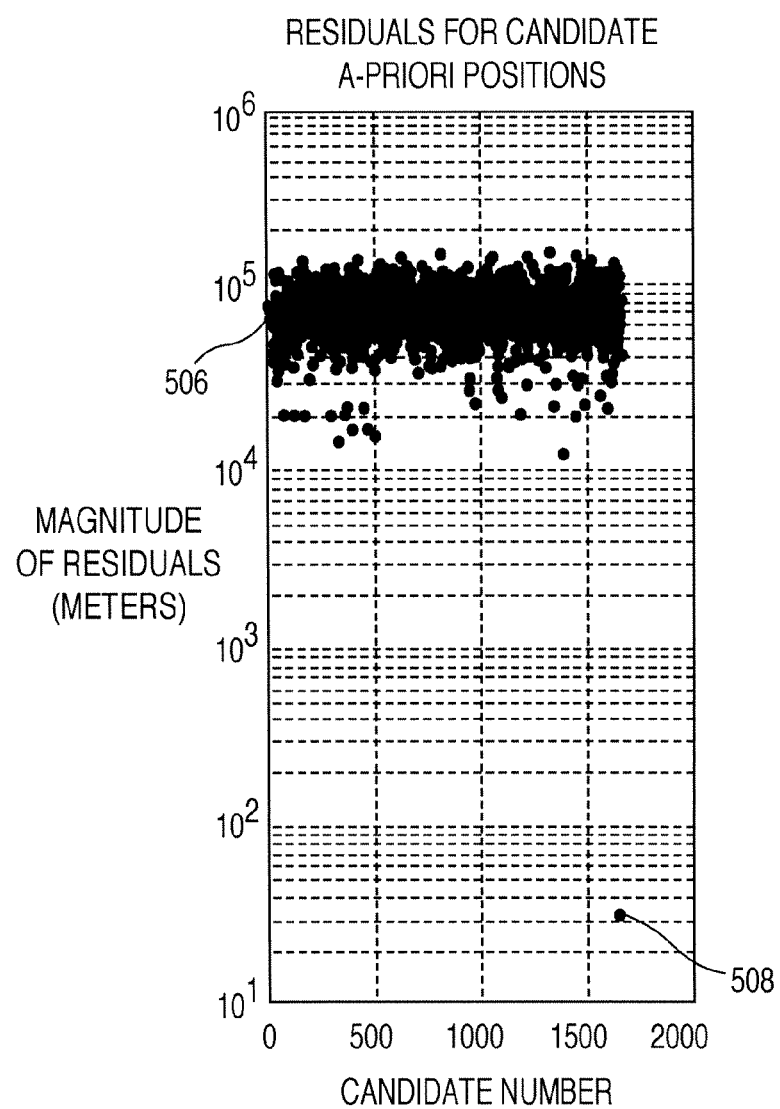

FIGS. 5A and 5B respectively depict a grid 502 used to determine receiver position in an embodiment of the invention and the residual magnitudes 506 computed during the position calculation process 200. In this example, the a-priori position is assigned as an arbitrary guess, in the middle of North America. Then the process 200 is performed for each possible a-priori position (grid point 504), and the magnitude of the a-posteriori residuals is examined. As each wrong candidate is rejected another candidate (another grid point 504) is generated by searching outwards on a 1 degree×1 degree grid 502. (Note that this 1 degree×1 degree grid is a slightly different embodiment than the 100 km×100 km grid described earlier; both embodiments are guaranteed to give at least one a-priori position that will yield the correct integers, and hence the correct position and absolute time.) The a-priori position is completed by assigning an a-priori altitude from a lookup table of topographical heights. FIG. 5A shows the 1,663 wrong candidates on a grid 504 and FIG. 5B shows the corresponding residual magnitudes 506, each one of the order of an incorrect millisecond integer (i.e., many kilometers). Once the search reaches an a-priori position in the vicinity of the true position (in San Jose, Calif.) the mathematical model causes the correct result to "snap" into place, and the correct position and time are calculated. The a-priori position candidate number 1,664 (residual magnitude 508 and grid point 510) is approximately 175 km east of the true position, which, in this example is close enough for the position and time solution to "snap" into place. The correct solution yields a residual that is approximately 30 meters, which is from one thousand to ten thousand times smaller than the incorrect residuals.

The large difference between "small" residuals (tens of meters) and "large" residuals (tens to hundreds of kilometers) makes this embodiment work very well in practice. However, it will be understood that other methods may be used to test the quality of the result, including comparing the calculated position and absolute time to a position and time obtained through some other means—such as the location of the radio tower used in a wireless-aided system. It will also be appreciated that in order to have non-zero residuals, it is necessary to have more independent observations than unknowns. In the embodiments described thus far, there have been five unknown parameters: three coordinates of position, common mode error, and absolute time. Thus at least six independent measurements are required to have non-zero residuals. If six GPS satellites can be observed, then the six measurements can be obtained from them. If there are not six satellites observable then there are several steps that can be taken, many of which are standard in the art. The number of measurements may be increased by including measurements from other sources (such as range measurements based on time-of-arrival from a wireless system, or angle-of-arrival measurements measured in a wireless system, or any other independent measurement that can be obtained).

The number of observables can also be increased by including, as "pseudo-measurements", known constraints on position, for example known or approximately known altitude can be introduced into the mathematical model as a pseudo-measurement. In the embodiment specified above, where the mathematical model is represented by the equation u=Hx, a pseudo-measurement for known altitude may be created by first specifying the a-priori position in coordinates of latitude, longitude, and altitude, then by setting the a-priori altitude to the known altitude, then by adding a new line to the matrix equation:

$$\begin{bmatrix} u \\ 0 \end{bmatrix} = \begin{bmatrix} H \\ 0 & 0 & 1 & 0 & 0 \end{bmatrix} x.$$

This approach effectively adds another measurement or observable to the mathematical model. This approach is standard in the art, and it is understood that it applies to any constraints that may be useful in solving for the unknown parameters.

Another approach is to reduce the number of unknown parameters. This may be performed by removing known, or approximately known parameters. The most commonly known parameter is altitude, and it can be removed from the mathematical model. Similarly the common mode error may be calibrated (for example, if the invention is implemented in a system with access to a stable oscillator) and removed from the mathematical model.

It will be appreciated that many combinations of the disclosed techniques may be applied to compute unknown values, including unknown absolute time.

For example, using the techniques of this invention, one can compute the time parameters alone, without computing the position. This is done, in the preferred embodiment, by fixing the position in the mathematical model to the a-priori position, and computing the remaining two unknown parameters: common mode error and absolute time.

Figure 6:
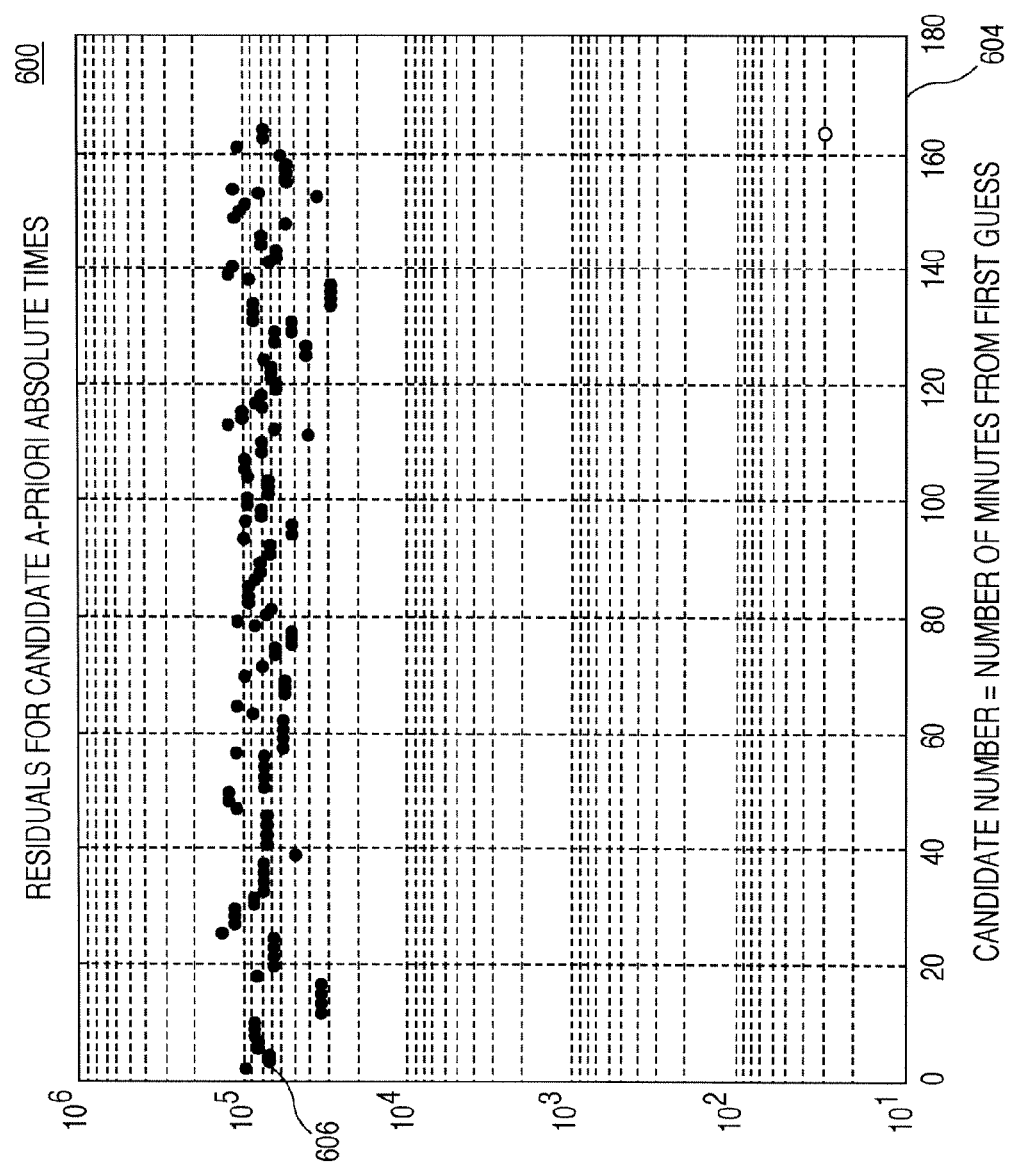
FIG. 6 depicts a graph of the residual time error used in computing an absolute time.

FIG. 6. is a graphical representation 600 of the residuals magnitudes (axis 602) associated with the different a-priori times (axis 604) that were attempted in an example embodiment of the invention. In this particular example, a range of possible times, each one-minute apart, is attempted for each of the grid points shown in FIG. 5. The first a-priori absolute time was chosen by guessing a time that turns out to be approximately two-and-a-half hours later than the true absolute time of reception. When the process 400 applies an a-priori position approximately 175 km away from the true position, and an a-priori time within one minute of the true absolute time, the mathematical model calculates the correct position and time, as shown in FIG. 5. In general, the mathematical model will calculate the correct position and time as soon as the a-priori position and time are close enough to cause process 300 to calculate the correct integers. As discussed, the preferred embodiment is guaranteed to find at least one such a-priori position and time, by creating an appropriate grid, and appropriately spaced time intervals.

In the embodiment described above, the invention has computed absolute position of a satellite signal receiver and absolute time of reception of satellite signals using pseudoranges and ephemeris. It may be desirable, however, to compute absolute position of a satellite signal receiver without ever computing absolute time of reception for the satellite signals. Thus, the present invention advantageously utilizes GPS measurements to determine receiver position without knowing or calculating precise GPS time-of-day (TOD).

To best explain the second embodiment of the present invention, it is necessary to understand why precise GPS TOD is needed in prior art GPS position calculations. GPS receivers compute position by measuring their distance from several satellites, by receiving a radio signal and measuring the delay between transmission and reception of said signal. Then, using satellite orbit data and precise TOD, the satellite positions can be determined at the moment that the signal was transmitted. Finally, using the measured distance from the known satellite positions, the receiver position is computed. Thus, in a prior art GPS receiver, if precise TOD is not known, then the precise satellite positions cannot be determined. The error in the position of each satellite will result in an error in the computed receiver position. This error can be very large, even with a small imprecision in the TOD. The GPS satellites move, relative to an observer on the earth, at up to 800 meters per second. Thus an error of just one second in precise time-of-day will result in a position error of 800 meters. This is why prior art GPS receivers have required precise time-of-day.

In accordance with the present invention, the mathematical model formed in step 216 of FIG. 2 is transformed into an equivalent model in which the absolute time variable is eliminated. In this manner, the present invention obviates the need to determine precise TOD. More specifically, techniques for eliminating one unknown variable in a multivariable set of equations before computing the other variables are well known in the art. An embodiment of the invention employing one such technique can be understood by studying the Taylor series description of the mathematical model formed in step 216:

$$\underline{u} = \begin{bmatrix} u_1 \\ \vdots \\ u_n \end{bmatrix}$$

$$= \begin{bmatrix} \partial\rho_1/\partial x & \partial\rho_1/\partial y & \partial\rho_1/\partial z & \partial\rho_1/\partial t_C & \partial\rho_1/\partial t_S \\ \vdots & \vdots & \vdots & \vdots & \vdots \\ \partial\rho_n/\partial x & \partial\rho_n/\partial y & \partial\rho_n/\partial z & \partial\rho_n/\partial t_C & \partial\rho_n/\partial t_S \end{bmatrix} \begin{bmatrix} x \\ y \\ z \\ t_C \\ t_S \end{bmatrix}$$

$$= \begin{bmatrix} \partial\rho_1/\partial x & \partial\rho_1/\partial y & \partial\rho_1/\partial z & c & -\dot{\rho}_1 \\ \vdots & \vdots & \vdots & \vdots & \vdots \\ \partial\rho_n/\partial x & \partial\rho_n/\partial y & \partial\rho_n/\partial z & c & -\dot{\rho}_n \end{bmatrix} \begin{bmatrix} x \\ y \\ z \\ t_C \\ t_S \end{bmatrix}$$

$$= H\underline{x}$$

The a-priori pseudorange residuals $u_i$ can be combined to transform the matrix H into sub-matrices that decouple the unknown absolute time variable $t_S$ from the other unknowns. Specifically, for each a-priori pseudorange residual $u_i$ where i is greater than 1, a new a-priori pseudorange $v_i$ can be formed as follows:

$$v_i = u_i \ast \dot{\rho}_1 - u_1 \ast \dot{\rho}_2$$

Note that this is equivalent to pre-multiplying the equation $\underline{u} = H\underline{x}$ by the matrix:

$$\begin{bmatrix} 1 & & & \\ -\dot{\rho}_2 & \dot{\rho}_1 & & \\ \vdots & & \ddots & \\ -\dot{\rho}_n & & & \dot{\rho}_1 \end{bmatrix}$$

The above transformation results in a new set of equations:

$$\begin{bmatrix} v_1 \\ v_2 \\ \vdots \\ v_n \end{bmatrix} = \begin{bmatrix} H_{1,1} & \cdots & H_{1,4} & H_{1,5} \\ G_{2,1} & \cdots & G_{2,4} & 0 \\ \vdots & \ddots & \vdots & \vdots \\ G_{n,1} & \cdots & G_{n,4} & 0 \end{bmatrix} \begin{bmatrix} x \\ y \\ z \\ t_C \\ t_S \end{bmatrix}$$

where the variable $t_S$ has been decoupled, $H_{i,j}$ are the coefficients of the H matrix, and $G_{i,j}$ are the coefficients resulting from the above pre-multiplication. As such, the equations relating the new a-priori pseudoranges $v_2$ through $v_n$ to the unknown variables x, y, x, and $t_C$ can be separated. Provided there are five or more pseudoranges available at the GPS receiver, the values of the remaining unknown variables can be calculated using linear algebra.

There are many similar well-known methods to eliminate unknown variables from a multivariable equation. Using these techniques, the present invention can solve for any subset of the unknown position and time variables. By solving only a subset of unknown position and time variables, the present invention reduces computation complexity and allows for lack of knowledge of a particular variable, for example, absolute time.

As is apparent from the proceeding discussion, the computation of position and absolute time, when compared to the conventional GPS solution, requires an additional independent pseudorange measurement to solve for the additional unknown absolute time parameter. In some cases, the GPS receiver may not be able to perform a sufficient number of pseudorange measurements to allow the full computation of position and absolute time. As such, in another embodiment of the invention, position is computed using previously computed absolute time information. In one embodiment, the absolute time is computed substantially as described above and then "held" to eliminate the need to re-compute absolute time during every position computation. Alternatively, a time-tag error state may be employed within a sequential estimator, such as a Kalman filter. As pseudorange measurements become available, the states of the sequential estimator, including the time-tag error state, are updated and converge to the correct position and absolute time. In either embodiment, the invention can determine the position of the GPS receiver even if insufficient pseudorange measurements exist to solve for absolute time in the classical "least-squares" approach of solving for m unknown variables with n independent measurements, where n≥m.

Figure 7:
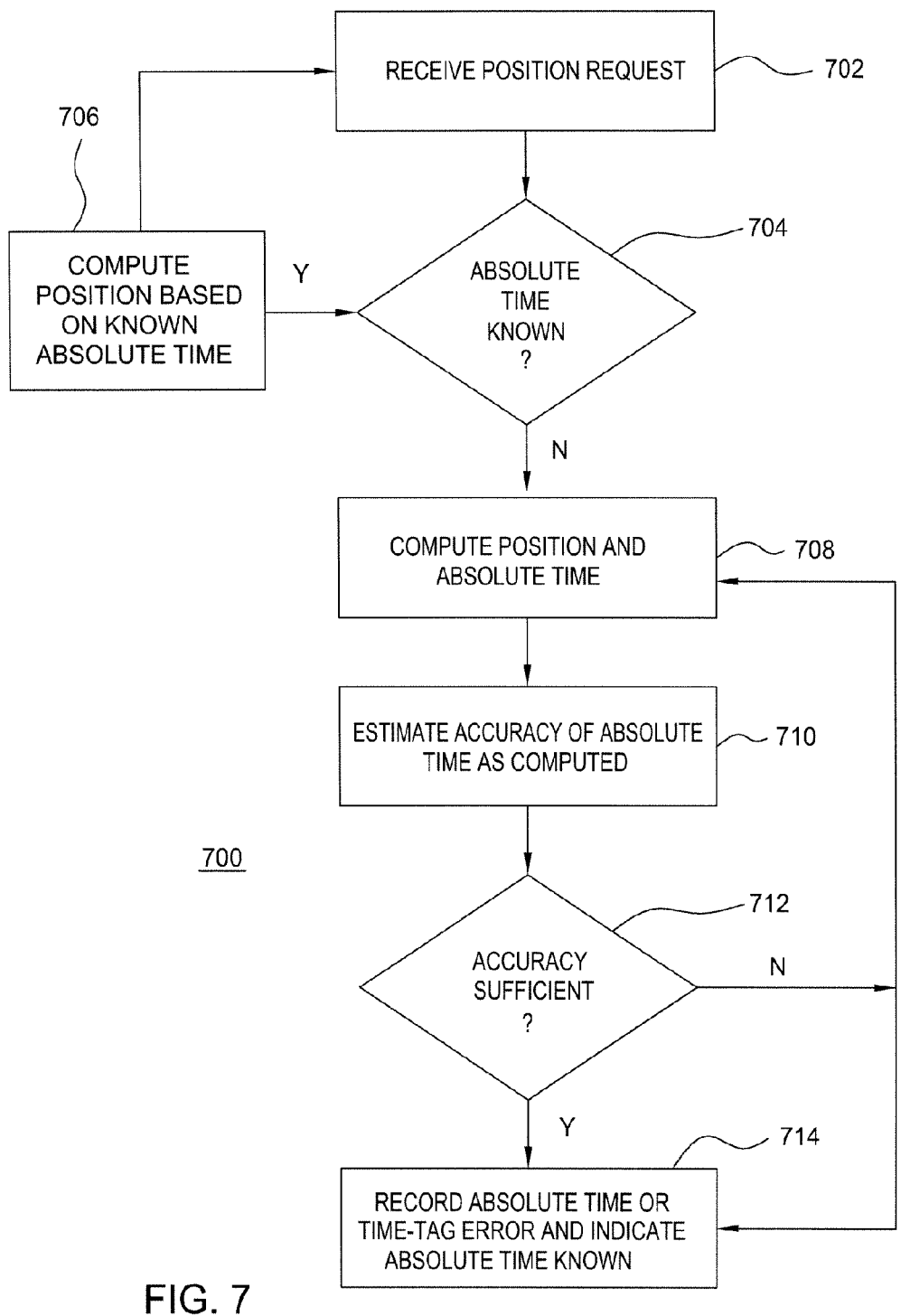
FIG. 7 is a flow diagram depicting one embodiment of a process of locating position of a GPS receiver in accordance with the invention.

FIG. 7 is a flow diagram depicting one embodiment of a process 700 of locating position of a GPS receiver in accordance with the invention. The process 700 begins at step 702, where the position of the GPS receiver is requested. At step 704, a determination is made as to whether or not absolute time has been designated as being known. If absolute time has not been designated as being known, the process 700 proceeds to step 708. At step 708, the position of the GPS receiver and absolute time are solved as described above with respect to FIG. 2.

At step 710, the accuracy of the absolute time computed at step 708 is estimated. A number of indicators may be employed to determine the accuracy of the computed absolute time. Notably, the number of independent pseudorange measurements used in the computation is a first-level indicator of accuracy. In general, the more pseudorange measurements, the more accurate the computation of absolute time. A more precise accuracy indicator involves the time-tag dilution of precision (TTDOP) of the position and absolute time computation of step 708 TTDOP is a geometrical factor that relates the accuracy of the computed absolute time to the accuracy of the individual pseudorange measurements used to compute the absolute time. Specifically, TTDOP is the ratio of the standard deviation of the errors in the calculated absolute time to the standard deviation of the measurement errors. Given the linearized mathematical model described above (i.e., $\underline{u} = H \underline{x}$), TTDOP is given by the square root of the $5^{th}$ diagonal element of $(H^T H)^{-1}$. The computed absolute time will be statistically less accurate when the geometry is poor (i.e. TTDOP is large). Another indicator of absolute time accuracy is the signal strength of each of the received satellite signals. If the signal strengths are low, the determination of absolute time will be statistically less accurate. Yet another accuracy indicator involves the a-posteriori pseudorange residuals described above. If the solution is over-determined, the magnitude of the a-posteriori pseudorange residuals provides an indication of absolute time accuracy. One or more of the aforementioned accuracy indicators may be used to provide an estimate of the accuracy of absolute time computed at step 708.

At step 712, a determination is made as to whether the accuracy of the computed absolute time is sufficient. If the accuracy is sufficient, the process 700 proceeds to step 714, where the computed absolute time information is recorded and absolute time is designated as being known. If the accuracy is not sufficient at step 712, the process 700 returns to step 702 without recording the computed absolute time information and repeats for additional position requests.

Notably, the computed absolute time information may be stored as a time tag error with respect to a local clock (e.g., the server clock 124 shown in FIG. 1 or clock within the mobile device 102). The local clock provides an a-priori estimate of absolute time. Once absolute time has been computed, the absolute time is compared to the time produced by the local clock ("local time") and time tag error is determined. The time tag error should not be confused with the common mode error. The common mode error is an error in the reference point for measuring sub-millisecond pseudoranges at the GPS receiver and has a total range of one millisecond. The time tag error is a value that represents the difference between absolute time and local time and may range to one minute or more. Mathematically, time tag error is related to local time and absolute time as follows:

$$t_{absolute} = t_{local} - t_S,$$

where $t_{absolute}$ is the absolute time, $t_{local}$ is the local time, and $t_S$ is the time tag error. Thus, if the time tag error is known at some particular time, the time tag error may be used to determine $t'_{absolute}$ at a subsequent time as follows:

$$t'_{absolute} = t'_{local} - t_S.$$

If, at step 704, the absolute time is designated as being known, the process 700 proceeds to step 706. At step 706, the position of the GPS receiver is computed based on the known absolute time information. In one embodiment, a conventional GPS position computation is performed at step 706 using pseudorange measurements, where the known absolute time information is used to determine the position of the satellites at the time of signal transmission using obtained satellite telemetry data. In another embodiment, the position of the GPS receiver and absolute time are solved using the time-free process of the invention, as described above with respect to FIG. 2. In this embodiment, the known absolute time information may be included used as a "pseudo measurement" along with the pseudorange measurements in the mathematical model described above. Notably, the pseudo measurement may be represented as $$\begin{bmatrix} u \\ \hat{t}_s \end{bmatrix} = \begin{bmatrix} H \\ 0 & 0 & 0 & 0 & 1 \end{bmatrix} x$$

where u is a vector of a-priori measurement residuals, previously described; and $\hat{t}_s$ is the time tag error pseudo measurement computed from the known absolute time as follows:

$$\hat{t}_s = t_{local} - t_{absolute}.$$

From step 706, the process 700 returns to step 702 and repeats for additional position requests.

In an alternative embodiment of the invention, rather than continually computing independent absolute times until a sufficiently accurate absolute time is obtained, the invention may average a plurality of computed time tag errors and record the average as the known time tag error. For example, if a computed absolute time is not sufficiently accurate at step 712, rather than discarding the computed absolute time, the computed time tag error may be stored so that it may be averaged with a subsequently computed time tag error. In this manner, a running average of time tag error results may be compared to the accuracy threshold at step 710 until the average becomes sufficiently accurate. Alternatively, rather than determining the accuracy of the average time tag error result using the aforementioned accuracy indicators, the invention may compute the average of a pre-defined number of absolute time results produced at step 708 and, when a sufficient number of time tag error results has been averaged, record the average time tag error as the known time tag error at step 714. For either of these averaging methods, or derivatives thereof, weighted averages may be used. The weighting may be chosen as a function of the estimated accuracy of each of the individual results.

The above embodiments of the invention have focused on GPS implementations where each position is computed independently, with the exception of using a previously computed absolute time. Some GPS implementations, however, do not produce independent position computations each time the position is requested. Rather, a history of information is used to continuously produce a filtered position result. The incorporation of history relies upon a formal model or an informal set of assumptions regarding the tendency of the GPS receiver to move from position to position. By placing bounds on the receiver motion (and the behavior of the receiver clock) the designer can choose filtering time constants that adequately track receiver dynamics, yet allow improved accuracy through the averaging process. Another advantage of filtering techniques is that the receiver may continue to operate when insufficient satellite measurements exist to create independent solutions. Such implementations are especially valuable in urban driving situations, where the vehicle dynamics can be modeled, and where frequency blockages hamper the ability to produce independent solutions.

Figure 8:
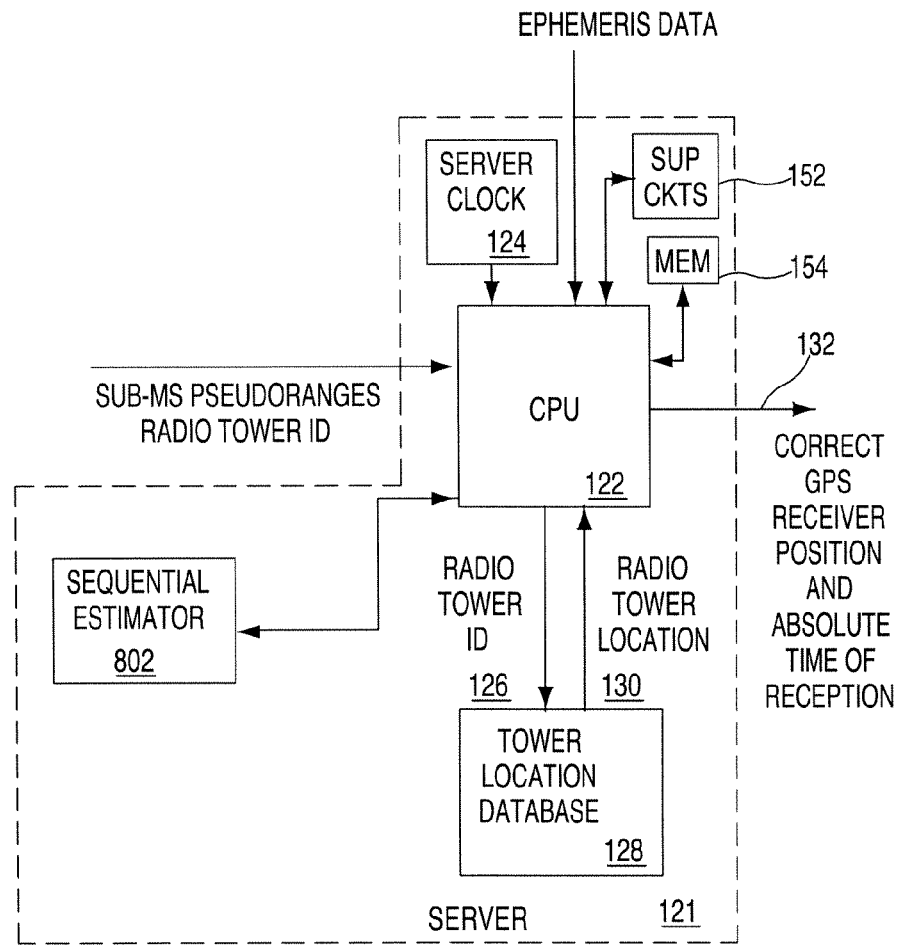
FIG. 8 is a block diagram depicting another embodiment of the server shown in FIG. 1.

Thus, in another embodiment of the invention, a sequential estimation process is used to determine GPS receiver position and absolute time. FIG. 8 is a block diagram depicting another embodiment of the server 121 of FIG. 1. Elements that are the same or similar to those shown in FIG. 1 are designated with identical reference numerals and are described in detail above. The server 121 further includes a sequential estimator 802 having a plurality of states, including a time-tag error state associated with absolute time. For example, the sequential estimator 802 may include position states, velocity states, a common mode error state, and a clock frequency error state, in addition to the time-tag error state. The sequential estimator 802 receives pseudorange measurements from the CPU 122, and provides GPS receiver position and absolute time to the CPU 122 upon request. Each set of pseudorange measurements is used to update the states of the sequential estimator 802. The update weighs both the current state information and the measurements to produce new state information. In another embodiment, the sequential estimator 802 may be part of the mobile device 102, rather than the server 121. In such an embodiment, a CPU (similar to CPU 122) is provided in the mobile device 102 to facilitate signal processing in the same manner as is described with respect to the server 121.

In one embodiment, the sequential estimator 802 is a Kalman filter that employs a linear dynamic model of a discrete GPS system. The GPS system is modeled by several states. In one embodiment, the states may be: position in three dimensions x, y, and z; common mode error; and time-tag error. The first four states are well known in the art. The novel aspect of this invention involves the addition of the time-tag error state. The time-tag error state is associated with absolute time, as described above. As is well known in the art, more states may be added, e.g. velocity states, clock frequency states, etc., without changing the nature of the current invention nor the description that follows.

A linear dynamic model $\Phi$ of the GPS system relates the states of the sequential estimator 802 at one discrete time interval, represented by the vector $x_k$, to the previous states of the sequential estimator 802, represented by the vector $x_{k-1}$, according to the following relationship:

$$x_k = \Phi_{k-1} x_{k-1} + w_{k-1}, E\{ww^T\} = Q,$$

where $w_{k-1}$ is the process noise associated with the dynamic model and Q is the covariance of the process noise. The matrix Q is a measure of how well $x_k$ is known given $x_{k-1}$ in the absence of measurements from the GPS receiver.

The GPS receiver computes a set of measurements $z_k$. In GPS, the relationship between the measurements obtained by the GPS receiver and the states of the sequential estimator 802 is non-linear and may be specified in terms of the following:

$$z_k = h(x_k) + v_k,$$

$$E\{vv^T\} = R,$$

where h denotes the non-linear model, $v_k$ denotes the noise on the GPS receiver measurements, and R is the covariance of the GPS receiver measurement noise.

Each iteration of the sequential estimator 802 begins by predicting the state values at the next time interval as follows:

$$\hat{x}_{k-} = \Phi_{k-1} \hat{x}_{k-1(+)},$$

$$E\{(\hat{x}-x)(\hat{x}-x)^T\} = P,$$

where $\hat{x}_{k-}$ is a vector of the predicted states at one time interval, $\hat{x}_{k-1(+)}$ is a vector of the predicted states at the previous time interval, and P is the covariance of the difference between the predicted states and the current states.

The updated state estimate is used to generate a prediction of the measurements as follows:

$$\hat{z}_k = h_k(\hat{x}_{k-}),$$

where $\hat{z}_k$ is a vector representing the predicted measurements. Simultaneously, the state error covariance is extrapolated as follows:

$$P_{k-} = \Phi_{k-1} P_{k-1} \Phi_{k-1}^T + Q_{k-1}.$$

In addition, the Kalman gain matrix is computed as follows:

$$K_k = P_{k-} H_k^T (H_k P_{k-} H_k^T + R_k)^{-1} H_k = \partial h_k / \partial x|_{x=\hat{x}_{k-}},$$

where H denotes a linearized form of the non-linear model h.

The Kalman gain is used to adjust the state estimates based on the difference between the observed and predicted measurements as follows:

$$\hat{x}_{k+} = \hat{x}_{k-} + K_k(z_k - \hat{z}_k).$$

Finally, the a-posteriori state covariance is computed in accordance with the following:

$$P_{k+} = (I - K_k H_k) P_{k-},$$

where I denotes the identify matrix.

The linearized measurement model depends on the measurements being incorporated into the Kalman filter. The primary filter inputs are the pseudorange measurements from the GPS receiver. In this case, the matrix H contains the line of sight vector and a 1 for the common mode error state, as is well understood by those skilled in the art.

By incorporating a time-tag error state in the sequential estimator 802, the invention is capable of determining the position of the GPS receiver even if insufficient pseudorange measurements exist to solve for absolute time in the classical "least-squares" approach of solving for m unknown variables with n independent measurements, where n≥m.

In an alternative embodiment of the invention, a direct time-tag error pseudo measurement may be applied to the sequential estimator 802 along with the pseudorange measurements. For example, the time-tag error is directly available when the TOW information is decoded from the ephemeris data. In this case, the H matrix includes the following row:

$$H = [0, 0, 0, 0, 1],$$

as described above.

In yet another embodiment of the invention, a direct time-tag error measurement may be used to eliminate the time-tag error state within the sequential estimator 802. Once the time-tag error is directly obtained from the TOW information, for example, the time-tag error state may be removed from the sequential estimator 802 and the sequential estimation process performed in a conventional manner.

Figure 9:
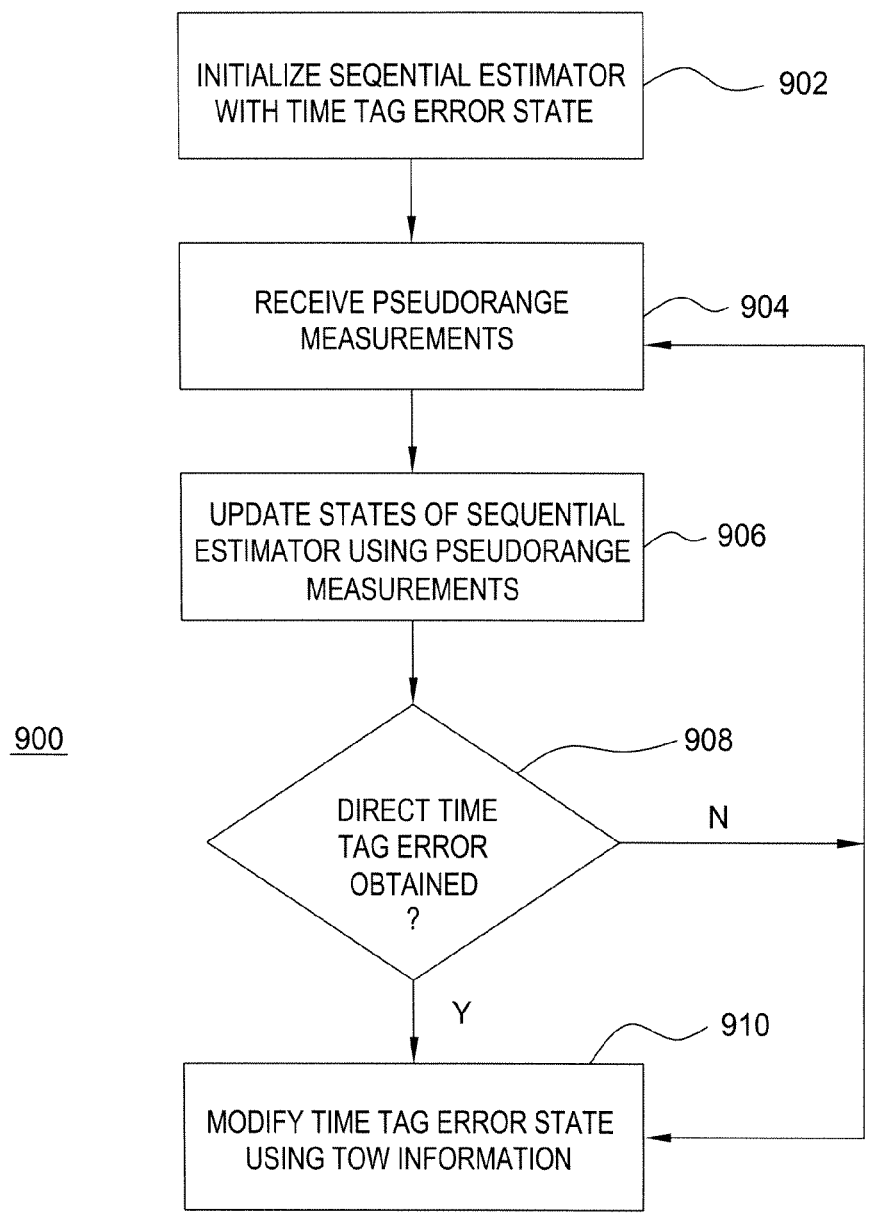
FIG. 9 is a flow diagram showing a process for updating the states of a sequential estimator in accordance with the invention.

FIG. 9 is a flow diagram showing a process 900 for updating the states of a sequential estimator in accordance with the invention. The process 900 begins at step 902, where the states of the sequential estimator are initialized with a time-tag error state. At step 904, pseudorange measurements are received from the GPS receiver. At step 906, the states of the sequential estimator are updated using the pseudorange measurements. The sequential estimation process is described above. At step 908, a determination is made as to whether a direct measurement of time-tag error has been obtained. If not, the process 900 returns to step 904, where additional pseudorange measurements are obtained. If a direct measurement of time-tag error has been obtained, the process 900 proceeds to step 910. At step 910, the time-tag error state is modified using the direct measurement of time-tag error. In one embodiment, the time-tag error state is removed from the sequential estimator. In another embodiment, a one-to-one correspondence between the time-tag error state and the direct measurement of time-tag error is maintained within the sequential estimator using a pseudo measurement. In either case, the process returns to step 904, where additional pseudorange measurements are obtained.

Figure 10:
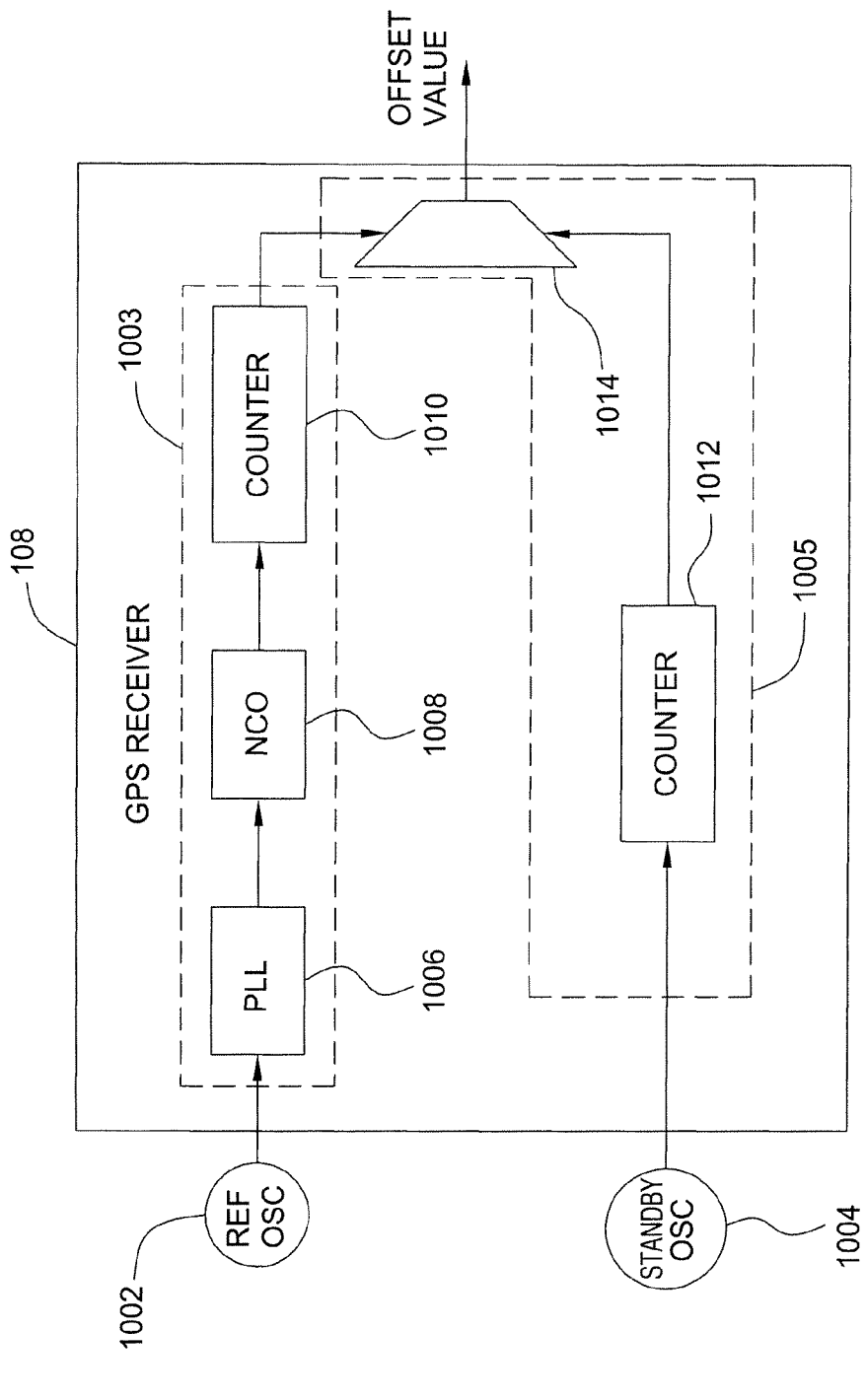
FIG. 10 is a more detailed block diagram depicting the mobile device of FIG. 1.

In some cases, it may be desirable selectively deactivate higher speed clock circuits within the mobile device 102 to conserve power. Since absolute time information is known as an offset with respect to a local clock, it is desirable to maintain time while the higher speed clock circuits are deactivated. FIG. 10 is a more detailed block diagram depicting the mobile device 102. Elements that are the same or similar to those shown in FIG. 1 are designated with identical reference numerals and are described in detail above. Notably, the mobile device 102 includes a reference oscillator 1002 (e.g., a voltage controlled oscillator (VCO) or a temperature compensated crystal oscillator (TCXO)) and a standby oscillator 1004. The GPS receiver 108 includes a primary clock circuit 1003 and a standby clock circuit 1005.

The primary clock circuit 1003 comprises a phase-locked loop (PLL) 1006, a numerically controlled oscillator (NCO) 1008 and a counter 1010. In operation, the reference oscillator 1002 drives the PLL 1006. The PLL 1006 produces a reference clock for the GPS receiver 108 (e.g., 80 MHz). The reference clock produced by the PLL 1006 is coupled to the NCO 1008, which generates a reference frequency (e.g., 1 KHz). The reference frequency produced by the NCO 1008 drives the counter 1010, which is used to keep time. For example, if the reference frequency provided by the NCO 1008 is 1 KHz, the counter 1010 may count the number of milliseconds that have elapsed. The counter 1010 may be used to timestamp pseudorange measurements obtained by the GPS receiver 108.

The oscillator 1002 and the PLL 1006 operate at relatively high speeds. In some applications, the reference oscillator 1002 within the mobile device 102 is turned off to conserve power. For example, if the mobile device 102 is a cellular telephone, the reference oscillator 1002 may be deactivated when the cellular telephone enters standby mode to conserve power. The standby oscillator 1004 remains active, but operates at a much lower operating frequency than the reference oscillator 1002. For example, the standby oscillator 1004 may provide a 32 KHz frequency reference.

The standby clock circuit 1005 includes a counter 1012 and a comparator 1014. The standby oscillator 1004 drives the counter 1012. The counter 1012 draws less power than the PLL 1006, since the counter 1012 operates at a much lower frequency (e.g., 32 KHz as compared to 80 MHz). Before the mobile device 102 enters standby mode, the comparator 1014 is used to compare the output of the counter 1012 within the standby clock circuit 1005 with the output of the counter 1010 within the primary clock circuit 1003. The comparator 1014 produces an offset value, which may be stored by the mobile device 102. Once the offset value from the comparator 1014 is stored, the primary clock circuit 1003 may be turned off to conserve power as the mobile device 102 enters standby mode and the oscillator 1002 is deactivated.

When the mobile device 102 exits standby mode, the primary clock circuit 1003 is re-enabled, and the comparator 1014 is used to compare the output of the counter 1012 within the standby clock circuit 1005 with the output of the counter 1010 within the primary clock circuit 1003. The comparator 1014 produces another offset value that may be compared with the previous offset value to restore the counter 1010 to the correct time. That is, the standby clock circuit 1005 keeps track of the elapsed time during the period when the primary clock circuit 1003 is turned off. The extent to which the standby clock circuit 1005 may be used to keep track of the elapsed time is subject to the drift of the standby oscillator 1004. Typically, the standby oscillator 1004 may drift by 10 parts-per-million, which equates to a 10 μs drift for each second the primary clock circuit 1003 is deactivated. Thus, if the standby clock circuit 1005 is to maintain elapsed time to within 100 ms, the primary clock circuit 1003 may be deactivated for up to 10,000 seconds.

In this manner, the time recorded by the counter 1010 within the primary clock circuit 1003 may be maintained if the GPS receiver 108 or the mobile device 102 enters a low power or standby mode. The time recorded by the counter 1010 may then by used as a previously computed time according to any of the above processes. The accuracy of the primary clock circuit 1003 may also be accounted for by introducing the produced time as a pseudo-measurement as described above, or by adjusting the covariance of the time tag error state in the sequential estimator (i.e., to compensate for the inaccuracy of the time tag error state relating to drift while the mobile device 102 or the GPS receive 108 was running in low power mode).

The foregoing explanation described the time tag error as a continuously valued variable. It should be noted that time tag error can be represented as an integer number of milliseconds, since the fractional millisecond error is absorbed by the common mode error ($t_C$). In some embodiments it may be desirable to utilize this constraint to improve the estimation of the time tag error, for example, by constraining it to an integer number of milliseconds during or after the estimation process.

Although the present invention has been described as using ephemeris data for obtaining satellite orbits and clock parameters, equivalent descriptions of such parameters can also be used. There are many equivalent descriptions of the satellite orbits that can be used, including descriptions of the orbits as viewed from the GPS receiver. The satellite ephemeris could be replaced by a model of the expected pseudoranges, a model of the expected geometric ranges and a clock model, or by another combination of models that describe the satellite orbits and/or clock parameters. Since all these models serve similar purposes, the term "ephemeris" as used hereinabove means satellite orbital parameters, satellite clock parameters, or like type functionally equivalent data.

Although the methods and apparatus of the present invention have been described with reference to GPS satellites, it will be appreciated that the teachings are equally applicable to positioning systems which utilize pseudolites or a combination of satellites and pseudolites. Pseudolites are ground based transmitters that broadcast a PN code (similar to the GPS signal) which may be modulated on an L-band carrier signal, generally synchronized with GPS time. The term "satellite", as used herein, is intended to include pseudolites or equivalents of pseudolites, and the term "GPS signals", as used herein, is intended to include GPS-like signals from pseudolites or equivalents of pseudolites.

In the preceding discussion the invention has been described with reference to application upon the United States Global Positioning System (GPS). It should be evident, however, that these methods are equally applicable to similar satellite systems, and in particular, the Russian Glonass system and the European Galileo system. The term "GPS" used herein includes such alternative satellite positioning systems, including the Russian Glonass system and the European Galileo system.

Although various embodiments that incorporate the teachings of the present invention have been shown and described in detail herein, those skilled in the art can readily devise many other varied embodiments that still incorporate these teachings.

What is claimed is:

1. A method of locating position of a satellite from a satellite signal receiver, the method comprising:
    receiving a first plurality of data from the satellite;
    computing an initial satellite position estimate, estimating a position of the satellite at a particular time according to a mathematical model and the first plurality of data;
    receiving a second plurality of data from the satellite; and
    computing an updated satellite position estimate, estimating the position of the satellite at the same particular time as estimated by the initial satellite position estimate, according to the mathematical model and the second plurality of data.

2. The method of claim 1, wherein the initial satellite position estimate and the updated satellite position estimate are computed within the satellite signal receiver.

3. The method of claim 1, wherein the first plurality of data comprises at least one pseudorange that estimates a distance of the satellite signal receiver to the satellite.

4. The method of claim 3, wherein the mathematical model is used to create an absolute time according to the at least one pseudorange.

5. The method of claim 4, wherein the initial satellite position estimate is computed according to the absolute time.

6. The method of claim 1, wherein computing the initial satellite position estimate comprises computing a particular time estimate.

7. The method of claim 6, wherein computing the updated satellite position estimate comprises updating the initial satellite position estimate and the particular time estimate.

8. The method of claim 1, wherein the mathematical model is dynamically updated according to the second plurality of data.

9. A system for computing position of a satellite, the system comprising:
- a receiver for receiving a first plurality of data from the satellite at a first time and receiving a second plurality of data from the satellite at a second time; and
- a processor for using a mathematical model, wherein the processor computes an initial satellite position estimate, estimating a position of the satellite at a particular time according to the mathematical model and the first plurality of data, and wherein the processor computes an updated satellite position estimate, estimating the position of the satellite at the same particular time as estimated by the initial satellite position estimate, according to the mathematical model and the second plurality of data.

10. The system of claim 9, wherein the processor and the receiver are in a single device.

11. The system of claim 9, wherein the first plurality of data comprises at least one pseudorange for estimating a distance of the receiver to the satellite.

12. The system of claim 9, wherein the mathematical model is used to create an absolute time according to the at least one pseudorange.

13. The system of claim 12, wherein the initial satellite position estimate is computed according to the absolute time.

14. The system of claim 9, wherein computing the initial satellite position estimate comprises computing a particular time estimate.

15. The system of claim 14, wherein computing the updated satellite position estimate comprises updating the initial satellite position estimate and the particular time estimate.

16. The system of claim 9, wherein the mathematical model is dynamically updated according to the second plurality of data.

17. The method of claim 4, wherein the absolute time is not initially accurately known.

18. The system of claim 12, wherein the absolute time is not initially accurately known.

* * * * *